United States Patent

Kamura et al.

[11] Patent Number: 6,085,717
[45] Date of Patent: Jul. 11, 2000

[54] FUEL CONTROL DEVICE FOR CYLINDER INJECTION TYPE INTERNAL COMBUSTION ENGINE

[75] Inventors: Hitoshi Kamura; Kenjiro Hatayama; Toshiro Nomura; Hiroki Tamura; Atsuyoshi Kojima, all of Tokyo, Japan

[73] Assignee: Mitsubishi Jidosha Kogyo Kabushiki Kaisha, Tokyo, Japan

[21] Appl. No.: 09/066,436

[22] PCT Filed: Aug. 8, 1997

[86] PCT No.: PCT/JP97/02781

§ 371 Date: Apr. 28, 1998

§ 102(e) Date: Apr. 28, 1998

[87] PCT Pub. No.: WO98/09064

PCT Pub. Date: Mar. 5, 1998

[30] Foreign Application Priority Data

Aug. 28, 1996 [JP] Japan .................................. 8-227196
Aug. 28, 1996 [JP] Japan .................................. 8-227197

[51] Int. Cl.[7] .................................................. F02B 17/00
[52] U.S. Cl. ........................................ 123/295; 123/325
[58] Field of Search ...................................... 123/295, 325

[56] References Cited

U.S. PATENT DOCUMENTS

| 4,066,046 | 1/1978 | McAlister | 123/295 |
| 4,788,942 | 12/1988 | Pouring et al. | 123/295 |
| 5,826,559 | 10/1998 | Ichimoto et al. | 123/295 |
| 5,875,756 | 3/1999 | Kamura et al. | 123/295 |

FOREIGN PATENT DOCUMENTS

| 63-42098 | 8/1988 | Japan . |
| 58-20374 | 4/1993 | Japan . |
| 1 00679 | 4/1996 | Japan . |
| 2 401119 | 9/1996 | Japan . |

Primary Examiner—Erick R. Solis

[57] ABSTRACT

A fuel control device for cylinder injection type internal combustion engines which is capable of cutting off fuel supplying to a combustion chamber depending upon an operating state of the engine and suitable for use in cylinder injection type engines, in which a compression stroke mode can be selected for the purpose of enabling shifting to fuel cutoff and shifting to fuel injection from cutoff without incurring shock of switching in the engine.

12 Claims, 9 Drawing Sheets

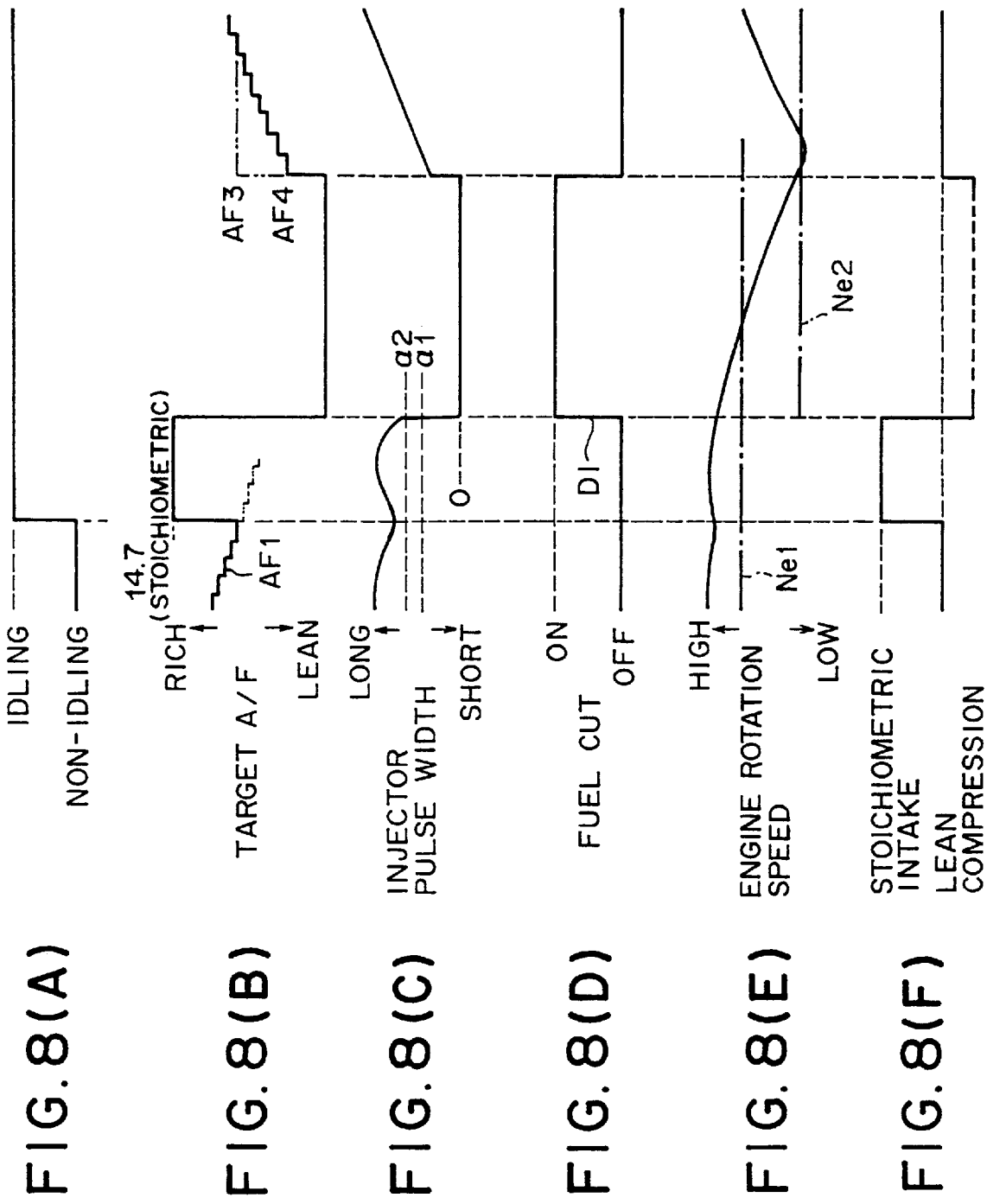

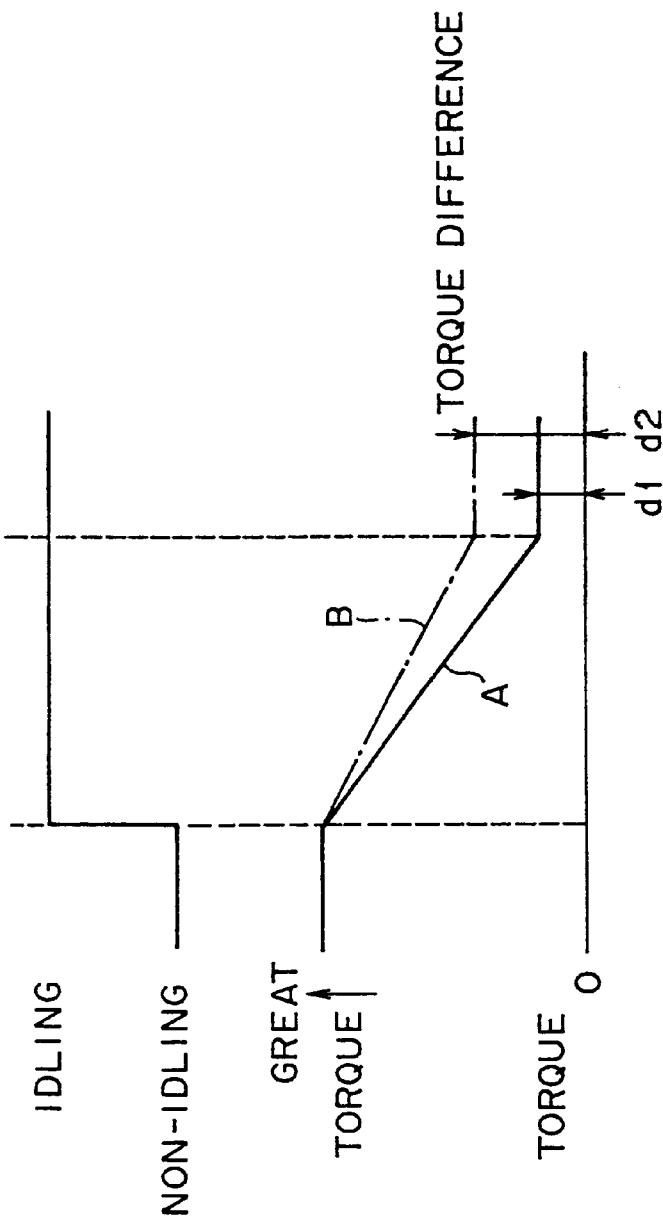

FUEL CONTROL DEVICE FOR CYLINDER INJECTION TYPE INTERNAL COMBUSTION ENGINE

This application is the national phase under 35 U.S.C. §371 of prior PCT International Application No. PCT/JP97/02781, which has an International filing date of Aug. 8, 1997, which designated the United States of America, the entire contents of which are hereby incorporated by reference.

TECHNICAL FIELD

The present invention relates to a fuel control apparatus for an in-cylinder injection internal combustion engine suitable for use with in-cylinder injection internal combustion engines which can select according to the operating state of the engine a fuel cut mode in which supply of fuel to the combustion chamber is cut.

BACKGROUND ART

In spark ignition type internal combustion engines (hereinafter also referred to as engines), including automobile engines, a technique which attempts to save fuel consumption and also prevent the excessive temperature rise of an exhaust gas purifying catalyzer due to excess hydrocarbon (HC) by cutting fuel injection from the fuel injection valve to cut supply of fuel to the combustion chamber has recently been developed.

Such a technique is also called fuel cut control. This fuel cut control can be performed only under certain conditions, because inevitably it causes a sudden reduction in the engine output (or, specifically an increase in the engine brake). In other words, in the case of low engine speeds, the fuel cut control cannot be carried out because there is the possibility that engine stall will take place. Of course, similarly, where a driver does not desire deceleration, the fuel cut control cannot be carried out.

Hence, in the case where the throttle valve is fully closed when the engine speed is greater than a predetermined speed, generally the fuel cut control is attempted to be performed.

In this case, for conditions for the opening degree of the throttle valve, in addition to a technique for directly detecting and judging a throttle opening degree, there is a technique for judging based on whether or not an engine is in an idle state.

In other words, the case where an engine goes to an idle state is one where the throttle valve is less than a predetermined micro opening degree, and generally, idle control is performed based on information from an idle switch which operates according to the throttle opening degree. If the throttle valve is less than a predetermined micro opening degree, it means this case nearly coincides with the case where the throttle valve is fully closed. Hence, the technique that causes fuel cut control to be carried out in the case where an engine goes to an idle state when the engine speed is greater than a predetermined speed has been developed.

However, where fuel cut control is carried out based on whether or not an engine is in an idle state, the fuel cut control is prohibited for a predetermined period after the engine has made a transition from a non-idle state to an idle state, for the purpose of confirming that the throttle valve has been fully closed.

Also, if fuel cut is performed, a sudden reduction in the output torque of an engine will be caused. In automobile engines, since a vehicle will be considerably shocked, another technique has been developed. Even if the accelerator pedal is off, the throttle valve will not be fully closed suddenly but will be gently closed by operation of a so-called dashpot, thereby avoiding a sudden reduction in the engine output torque and a great shock to a vehicle.

The aforementioned fuel cut control, incidentally, has been applied to a multipoint injection (MPI) engine equipped with fuel injection valves each in an intake port of each cylinder, but, since an in-cylinder injection engine (in-cylinder injection internal combustion engine) with a fuel injection valve faced so as to inject fuel directly into the combustion chamber within the cylinder has been developed in recent years, the fuel cut control is desired to be applied to such an in-cylinder injection engine.

Such an in-cylinder injection engine can inject fuel into the combustion chamber at any time regardless of the opening and closing of the intake valve and therefore can carry out various characteristic operations as follows:

For example, a fuel injection mode with a compression stroke as primary (this is referred to as a compression stroke injection mode) can be set. In this compression stroke injection mode, stable combustion can be realized in a ultra-lean air-fuel ratio state by stratified combustion making use of the stratified intake-air flow formed within the cylinder. In other words, since injected fuel can be collected near the spark plug by making use of stratified intake-air flow, operation can be performed saving fuel consumption considerably with the entire fuel-air ratio caused to be in an extremely lean air-fuel state, obtaining stable ignitability with only the vicinity of the spark plug caused to be in a good ignitable air-fuel state (i.e., stoichiometric air-fuel ratio state or air-fuel ratio state on a side slightly richer than the stoichiometric air-fuel ratio state).

Of course, a fuel injection mode with an intake stroke as primary (this is referred to as an intake stroke injection mode) can be set. In this intake stroke injection mode, stable ignition and reliable flame propagation are realized evening the entire air-fuel ratio state of the combustion chamber by premixing fuel, whereby operation can be performed so that sufficiently high output is obtainable. In this intake stroke injection mode, a stoichiometric mode in which great output is obtained by adjusting an air-fuel ratio to near a stoichiometric air-fuel ratio and a lean mode in which fuel consumption can be saved by causing an air-fuel ratio to be leaner than a stoichiometric air-fuel ratio are considered. In addition, in view of the case where great output is desired to be obtained temporarily during rapid acceleration, etc., an enrich mode in which an air-fuel ratio is richer than a stoichiometric air-fuel ratio is considered.

In such an in-cylinder injection engine, incidentally, the engine is operated by properly selecting various operating modes such as the aforementioned compression stroke injection mode (lean compression mode or late lean mode), a stoichiometric intake stroke injection mode (stoichiometric mode), a lean intake stroke injection mode (lean intake mode or early lean mode), and an enrich intake stroke injection mode (enrich mode). The selection of these operating modes is considered to be performed based on engine speed and engine load.

In other words, the lean compression mode is selected in an area where engine speed is low and engine load is small, and if the engine speed becomes higher than the low engine speed and the engine load becomes great, the lean intake mode, the stoichiometric mode, and the enrich mode will be selected in the recited order, as the degree becomes greater.

Engine load nearly corresponds to the degree of depression of the accelerator pedal, so when the lean compression mode is selected, the depression degree of the accelerator pedal is slight and therefore the throttle opening degree is slight. On the other hand, in the lean compression mode in which operation is performed in a super-lean state in which an air-fuel ratio is extremely great, if there is no sufficient intake-air quantity, the engine output at the same throttle opening degree will become small. Also, stratified flow will become weak and stable combustion will be difficult to be carried out. Therefore, if a throttle opening degree is slight and an intake-air quantity is regulated with the throttle valve, the operation in the lean compression mode will be difficult. For this reason, in the in-cylinder injection engine, the air quantity regulated with the throttle valve is supplemented, by providing a bypass passage (air bypass passage) which bypasses the throttle valve and controlling the opening degree of a valve (air bypass valve) provided in the air bypass passage.

However, if such fuel cut control employed in the conventional MPI engine, as it is, is applied to such an in-cylinder injection engine, a sudden reduction in the output torque of the engine will be caused when fuel cut is started, and in the case of a vehicle-mounted engine, a vehicle will be considerably shocked.

FIG. 9 is a diagram schematically showing the characteristics of the output torque of an engine in the case where the engine makes a transition from a non-idle state to an idle state when the engine speed is greater than a predetermined speed (fuel cut condition speed) Ne1 and then makes a transition to a fuel cut mode. In the figure, "A" represents a torque change characteristic in the case of the conventional MPI engine and "B" represents a torque change characteristic in the case of the in-cylinder injection engine. In this case, after establishment of fuel cut conditions (i.e., after the engine has gone to an idle state), the throttle valve is not fully closed suddenly but is gently closed through operation of a so-called dashpot.

As shown in FIG. 9, in the conventional MPI engine, in the circumstances in which fuel cut control is started, i.e., in the case where the throttle valve is fully closed or the engine is in an idle state (see FIG. 9(A)), irregular combustion takes place in the engine and therefore the engine output torque is already reduced easily. With the operation of the dashpot, the intake-air quantity is reduced, accordingly the fuel injection quantity is also reduced, and the engine output torque is considerably reduced. For this reason, when a transition to a fuel cut mode is made, the torque difference di becomes small as shown in FIG. 9(B) and a vehicle will not be easily shocked.

On the other hand, in the in-cylinder injection engine, in the circumstances in which fuel cut control is started, i.e., in the case where the throttle valve is fully closed or the engine is in an idle state, operation is generally performed in the lean compression mode. However, in this lean compression mode, combustion is favorably performed even with a small quantity of fuel injection. Therefore, even if the engine goes to an idle state and the dashpot is operated, the engine output torque will be difficult to be reduced. For this reason, when a transition to a fuel cut mode is made, the torque difference d2 becomes great as shown in FIG. 9(B), gives a great shock to a vehicle, and easily gives a feeling of physical disorder to the driver, etc.

Such a disadvantage of a vehicle being considerably shocked does not arise only when a transition to a fuel cut mode is made, but it also arises when a return from a fuel cut mode to a fuel injection mode is made.

In other words, even if the engine remains in an idle state, if the engine speed is excessively reduced, in the case where there is a request to increase engine torque thereafter, the engine cannot quickly correspond to the request. Therefore, even in an idle state, if engine speed is reduced to less than a predetermined speed (fuel injection return condition speed) Ne2 (Ne2<Ne1), a return to a fuel injection mode will be performed.

At this time, torque fluctuation will occur by the amount of the torque difference d2 such as that shown in FIG. 9. After all, a vehicle will have a great shock (acceleration shock).

Note that if the engine goes from an idle state to a non-idle state during a fuel cut mode, of course the fuel cut mode will return to the fuel injection mode. At this time, a driver depresses the accelerator pedal to request acceleration, so even if an acceleration shock takes place, the driver will not easily have a feeling of physical disorder and this case will not be a great problem.

As previously described, such problems are conspicuous in in-cylinder injection internal engines, but, in a conventional engine (port injection engine), in order to reduce a torque shock which occurs at the time of a transition to a fuel cut mode and at the time of a return to a fuel injection mode, the techniques that cause a fuel supply quantity to be reduced gradually at the time of a transition to a fuel cut mode and cause a fuel supply quantity to be increased gradually at the time of a return Lo a fuel injection mode are disclosed, for example, in Japanese Patent Publication Nos. SHO 58-20374 and SHO 63-42098.

These techniques, however, are for port injection engines, so if the fuel injection quantity at the time of a start of fuel cut and the fuel injection quantity at the time of a return to fuel cut, disclosed in these prior techniques, are employed to control fuel cut in the compression stroke injection mode of an in-cylinder injection engine, there will be the problem that output will be excessive and therefore a torque shock will occur, as previously described. Therefore, this technical idea, as it is, cannot be applied to the in-cylinder injection engine to which the present invention is applied. In other words, the in-cylinder injection engine has a particular fuel injection mode such as the compression stroke injection mode, as previously described, and for the torque shock reduction at the time of the switching between the fuel injection mode and the fuel cut mode, a particular efficient technique is desired to be developed.

The present invention has been made in view of the aforementioned problems, and accordingly, it is an object of the invention to provide a fuel control apparatus for an in-cylinder injection internal engine which can start fuel cut control without causing a switching shock even in an in-cylinder injection internal engine. Another object of the invention is to provide a fuel control apparatus for an in-cylinder injection internal engine which can make a transition to a fuel cut mode and a transition from a fuel cut mode to a fuel injection mode without causing a switching shock, contriving air-fuel ratio control in a compression stroke injection mode in an in-cylinder injection internal engine.

SUMMARY OF THE INVENTION

For those objects, in a fuel control apparatus for an in-cylinder injection internal combustion engine of the present invention, the internal combustion engine injects fuel directly into a combustion chamber and is able to select according to an operating state of the internal combustion engine a compression stroke injection mode in which fuel injection is performed mainly on a compression stroke. The fuel control apparatus comprises: deceleration state detection means for detecting whether or not the internal combustion engine is in a deceleration state; idle detection means for detecting whether or not the internal combustion engine is in an idle state; target air-fuel ratio setting means for setting a target air-fuel ratio in the compression stroke injection mode; and air-fuel ratio control means which can control an air-fuel ratio, based on the target air-fuel ratio set by the target air-fuel ratio setting means; wherein the target air-fuel ratio setting means sets a first target air-fuel ratio as the target air-fuel ratio, when the deceleration state detection means detects that the internal combustion engine is in a deceleration state and also the idle state detection means detects that the internal combustion engine is not in an idle state, at the time of the compression stroke injection mode, and also sets as the target air-fuel ratio a value changed stepwise toward a second target air-fuel ratio on a leaner side than the first target air-fuel ratio, when the deceleration state detection means detects that the internal combustion engine is in a deceleration state and also the idle detection means detects that the internal combustion engine is in an idle state, at the time of the compression stroke injection mode.

With this, at the time of the compression stroke injection mode, when the internal combustion engine is in a deceleration state but not in an idle state, the first target air-fuel ratio is set as a target air-fuel ratio, and when the internal combustion engine is in a deceleration state and in an idle state, a value changed stepwise toward a second target air-fuel ratio on a leaner side than the first target air-fuel ratio is set as a target air-fuel ratio.

Therefore, even if the engine is in a non-idle state during deceleration, the engine output torque will be reduced. Thereafter, in the case where the engine goes to an idle state (generally, in the case where fuel cut conditions are established), even when a transition to fuel cut mode is made, the transition can be quickly made without a torque shock.

In addition, when the engine goes to an idle state during deceleration, the target air-fuel ratio for each control cycle is set so that it gradually approaches such a second target air-fuel ratio as to further reduce the engine output torque. Therefore, in the case where the engine goes to an idle state during deceleration and fuel cut conditions are established, the engine output torque can be sufficiently reduced and a transition to fuel cut mode thereafter can also be performed without a torque shock.

Thus, the transition to fuel cut mode can be made reducing the output torque of the engine, and there is the advantage that fuel cut control can be quickly started suppressing a torque shock.

Note that the first target air-fuel ratio preferably is set so as to change stepwise to a lean side.

Furthermore, in such construction, preferably the target air-fuel ratio setting means first increases the target air-fuel ratio instantly to a third target air-fuel ratio on a richer side than the second target air-fuel ratio and then sets a value changed stepwise toward the second target air-fuel ratio, when the deceleration state detection means detects that the internal combustion engine is in a deceleration state and also the idle detection means detects that the internal combustion engine is in an idle state, at the time of the compression stroke injection mode.

With this, the output torque of the engine can be sufficiently reduced, and the transition to fuel cut mode thereafter can be more quickly performed without a torque shock.

In addition, in a fuel control apparatus for an in-cylinder injection internal combustion engine of the present invention, the internal combustion engine injects fuel directly into a combustion chamber and is able to select according to an operating state of the internal combustion engine a fuel supply mode including a compression stroke injection mode in which fuel injection is performed mainly on a compression stroke and a fuel cut mode in which supply of fuel to the combustion chamber is cut. Furthermore, the internal combustion engine is able to select the compression stroke injection mode when it is returned from the fuel cut mode to the fuel supply mode. The fuel control apparatus comprises: idle detection means for detecting whether or not the internal combustion engine is in an idle state; judgment means for judging whether or not return conditions from the fuel cut mode to the fuel supply mode have been established, based on detection formation from the idle detection means and the operating state of the internal combustion engine; deceleration state detection means for detecting a degree of deceleration of the internal combustion engine; target air-fuel ratio setting means for setting a target air-fuel ratio for the compression stroke injection mode; and air-fuel ratio control means which can control an air-fuel ratio, based on the target air-fuel ratio set by the target air-fuel ratio setting means; wherein the target air-fuel ratio setting means sets a first target air-fuel ratio as the target air-fuel ratio, when the judgment means judges that the return conditions have been established and also the degree of deceleration detected by the deceleration state detection means is equal to or greater than a predetermined value; also sets as the target air-fuel ratio a second target air-fuel ratio on a leaner side than the first target air-fuel ratio, when the judgment means judges that the return conditions have been established and also the degree of deceleration detected by the deceleration state detection means is less than the predetermined value; and furthermore performs a return from the fuel cut mode to the fuel supply mode, while the air-fuel ratio control means is controlling an air-fuel ratio with the first or second return target air-fuel ratio set by the target air-fuel ratio setting means, at the time of the establishment of the return conditions.

Therefore, when the return conditions are established and also the degree of deceleration is equal to or greater than a predetermined value, the first target air-fuel ratio is set as a target air-fuel ratio, and when the return conditions are established and also the degree of deceleration is less than the predetermined value, the second target air-fuel ratio on a leaner side than the first target air-fuel ratio is set as the target air-fuel ratio. At the time of the establishment of the return conditions, the return from the fuel cut mode to the fuel supply mode is performed, controlling an air-fuel ratio with the first or second return target air-fuel ratio.

With this, during the sudden deceleration of the internal combustion engine, if an increase in the engine output torque is insufficient, a reduction in the engine speed cannot be prevented, but, if the relatively rich first return target air-fuel ratio is set and the air-fuel ratio is controlled, a reduction in the engine speed can be prevented ensuring an increase in the engine output torque. For this reason, thereafter preparations can be made quickly and smoothly for the return control to the original air-fuel ratio. Also, if the deceleration of the internal combustion engine is gentle, the sudden increase in the engine output torque thereafter will cause a torque shock. Therefore, if the relatively lean first return target air-fuel ratio is set and the air-fuel ratio is controlled, the fuel supply can be returned without causing a torque shock. For this reason, thereafter if the return target air-fuel ratio is gradually reduced toward a target air-fuel ratio on a fuel-enriched side, it will become possible to control a fuel-air ratio toward the original air-fuel ratio quickly and smoothly.

Therefore, there is the advantage that a return can be performed controlling the engine output torque properly at the time of the return to fuel cut to fuel supply and that a fuel supply return can be performed suppressing a torque shock.

Note that the target air-fuel ratio setting means preferably is set so that in the case where the second return target air-fuel ratio is set as the target air-fuel ratio, thereafter the target air-fuel ratio is gradually reduced toward the first return target air-fuel ratio on a fuel-enriched side.

Furthermore, in a fuel control apparatus for an in-cylinder injection internal combustion engine of the present invention, the internal combustion engine injects fuel directly into a combustion chamber and is able to select according to an operating state of the internal combustion engine a fuel supply mode including a compression stroke injection mode in which fuel injection is performed mainly on a compression stroke and an intake stroke injection mode in which fuel injection is performed mainly on an intake stroke, and a fuel cut mode in which supply of fuel to the combustion chamber is cut. The fuel control apparatus comprises: deceleration state detection means for detecting whether or not the internal combustion engine is in a deceleration state; idle detection means for detecting whether or not the internal combustion engine is in an idle state; target air-fuel ratio setting means for setting a target air-fuel ratio for the compression stroke injection mode; and air-fuel ratio control means which can control an air-fuel ratio, based on the target air-fuel ratio set by the target air-fuel ratio setting means; wherein the target air-fuel ratio setting means sets a first target air-fuel ratio as the target air-fuel ratio, when the deceleration state detection means detects that the internal combustion engine is in a deceleration state and also the idle detection means detects that the internal combustion engine is not in an idle state, at the time of the compression stroke injection mode; and wherein the fuel supply mode is switched from the compression stroke injection mode to the intake stroke injection mode, when the deceleration state detection means detects that the internal combustion engine is in a deceleration state and also the idle detection means detects that the internal combustion engine is in an idle state, at the time of the compression stroke injection mode.

With this, at the time of the compression stroke injection mode, when the internal combustion engine is in a deceleration state and not in an idle state, the first target air-fuel ratio is set as a target air-fuel ratio. At the time of the compression stroke injection mode, when the internal combustion engine is in a deceleration state and in an idle state, the fuel supply mode is switched from the compression stroke injection mode to the intake stroke injection mode.

If the fuel supply mode is thus switched from the compression stroke injection mode to the intake stroke injection mode, the output torque of the engine will easily be reduced because irregular combustion which did not take place in the compression stroke injection mode takes place in the engine. Therefore, a torque shock can be reduced when a transition to a fuel cut mode is made.

Therefore, the transition to fuel cut mode can be made reducing the output torque of the engine, and there is the advantage that fuel cut control can be quickly started suppressing a torque shock.

Moreover, in a fuel control apparatus for an in-cylinder injection internal combustion engine of the present invention, the internal combustion engine injects fuel directly into a combustion chamber and has a fuel cut mode in which supply of fuel to the combustion chamber is cut. Furthermore, the internal combustion engine is able to select the fuel cut mode in accordance with an operating state of the internal combustion engine. The fuel control apparatus comprises: injection period setting means for setting a fuel injection period for the fuel injection valve; judgment means for judging whether or not fuel cut conditions have been established, based on the operating state of the internal combustion engine; and mode selection means for selecting the fuel cut mode, if the judgment means judges that the fuel cut conditions have been established and also the fuel injection period set by the injection period setting means is less than a predetermined injection period.

Therefore, if the fuel cut conditions have been established and also the set fuel injection period is less than a predetermined injection period, the fuel cut mode will be selected.

Thus, since the fuel cut control is performed after the fuel injection period has been less than a predetermined injection period, a transition to a fuel cut mode is made after the torque produced by the engine has been reduced to some degree. Therefore, there is the advantage that the fuel cut control can be started, suppressing a torque shock.

In such construction, the mode selection means preferably is constructed so that it selects the fuel cut mode, if the judgment means judges that the fuel cut conditions have been established but a state, in which the fuel injection period set by the injection period setting means is not less than a predetermined injection period, continues only for a predetermined period.

Therefore, the suppression of a torque shock cannot be sufficiently performed when a transition to a fuel cut mode is made, but a fuel cut effect can be obtained with reliability.

Furthermore, the in-cylinder injection internal combustion engine preferably is provided with a fuel supply mode including a compression stroke injection mode in which fuel injection is performed mainly on a compression stroke and a fuel supply mode including an intake stroke injection mode in which fuel injection is performed mainly on an intake stroke, and is constructed so that these fuel injection modes can be switched in accordance with the operating state of the internal combustion engine. The predetermined injection period preferably is set separately for each of the fuel injection modes and the predetermined injection period in the compression stroke injection mode is set to a shorter period than the predetermined injection period in the intake stroke injection mode.

If the predetermined injection period is set according to the operating mode of the engine in this way, a suppression effect of torque shock occurrence and a fuel cut effect can be balanced with each other.

Note that preferably the fuel cut conditions for selecting the fuel cut mode are that rotation speed of the internal combustion engine is equal to or greater than a predetermined rotation speed and that the internal combustion engine is in an idle state.

BRIEF DESCRIPTION OF THE DRAWINGS

FIG. 8 is a timing chart describing the control of the fuel control apparatus for an in-cylinder injection internal combustion engine as a second embodiment of the present invention, (A) showing whether or not the engine is in an idle state, (B) showing a target air-fuel ratio, (C) showing an injector pulse width (fuel injection time), (D) showing a fuel cut state, (E) showing engine speed, and (F) showing an operating mode (fuel injection mode); and FIG. 9 is a diagram describing problems to be solved by the present invention, (A) showing whether or not the engine is in an idle state and (B) showing the output torque of the engine.

BEST MODE FOR CARRYING OUT THE INVENTION

A description will hereinafter be made of an embodiment of the present invention by the drawings.

FIGS. 1 through 7 show a fuel control apparatus for an in-cylinder injection internal combustion engine as a first embodiment of the present invention. Based on these figures, the first embodiment will be described.

First, with respect to the construction of the in-cylinder injection internal combustion engine (hereinafter referred to as an in-cylinder injection engine) according to this embodiment, a description will be made referring to FIG. 4.

Figure 4:
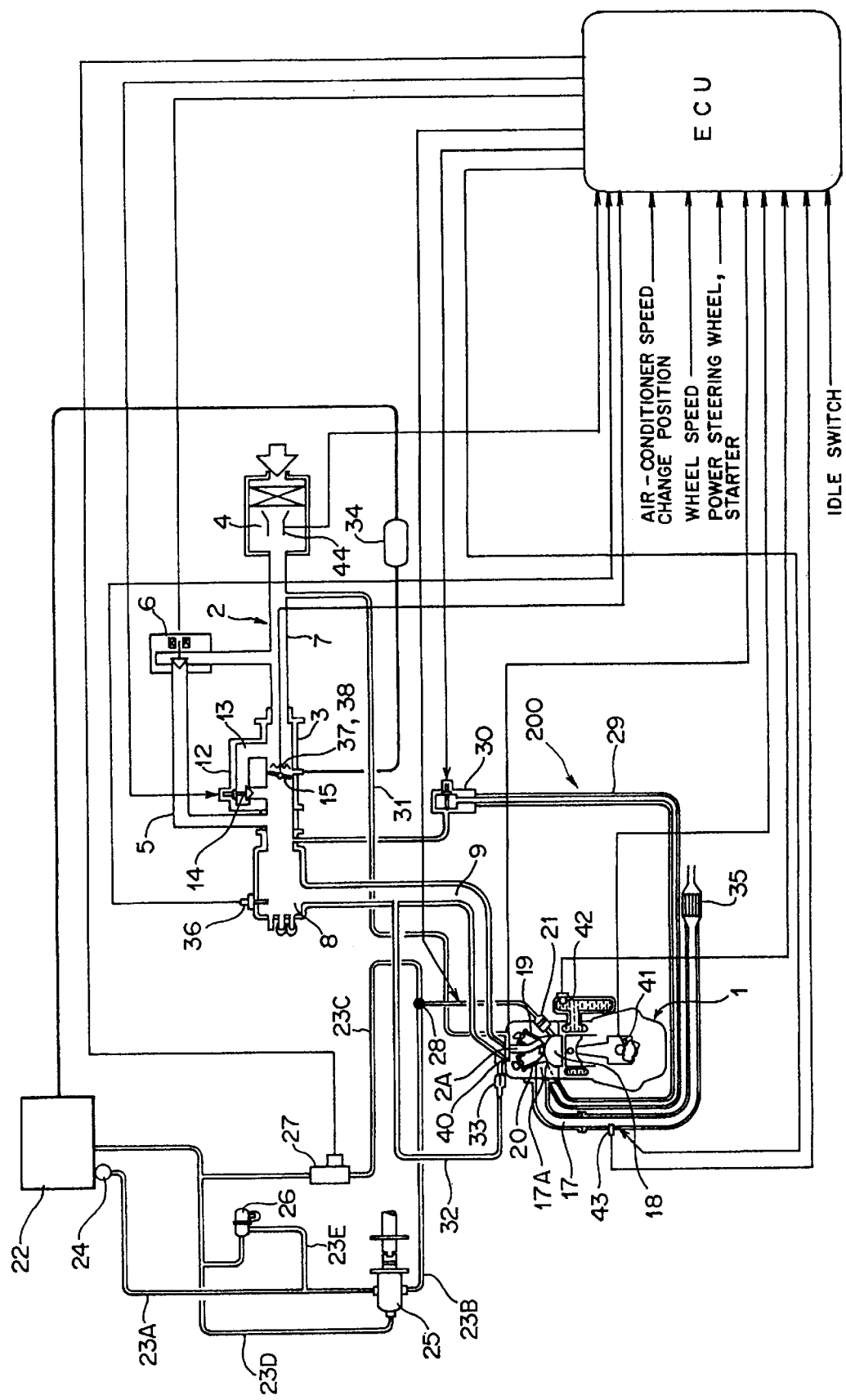
FIG. 4 is a diagram showing the essential construction of an in-cylinder injection internal combustion engine according to the first embodiment of the present invention.

In FIG. 4, 1 is an engine main body, 2 an intake passage, 3 a throttle valve installation portion, 4 an air cleaner, 5 a bypass passage (second bypass passage), and 6 a second air bypass valve (#2ABV) which can regulate the quantity of air that flows through the bypass passage 5. The intake passage 2 is constituted by an intake pipe 7, a surge tank 8, and an intake manifold 9, connected in this order from the upstream side. The bypass passage 5 is provided on the upstream side of the surge tank 8. The bypass valve 6 is driven at a required opening degree with a stepper motor, but the opening degree of this bypass valve 6 may also be adjusted with the employment of duty control by an electromagnetic valve.

Furthermore, 12 is one section equipped with an idle speed control function, and consists of a bypass passage (first bypass passage) 13 and a first air bypass valve (#1ABV) 14 which serves as a bypass valve. The #1ABV 14 is driven with a stepper motor (not shown). Also, 15 is a throttle valve, and the first bypass passage 13 and the second bypass passage 5 connect the respective upstream and downstream ends thereof to the intake passage 2 so as to bypass the portion of the intake passage 2 in which the throttle valve 15 is provided.

Furthermore, the opening and closing controls of the second air bypass valve 6 and the first air bypass valve 14 are controlled through an electronic control unit (ECU) 16.

Also, 17 is an exhaust passage and 18 a combustion chamber. The openings of the intake passage 2 and the exhaust passage 17 to the combustion chamber 18, i.e., an intake port 2A and an exhaust port 17A are provided with an intake valve 19 and an exhaust valve 20.

Then, 21 is a fuel injection valve (injector). In this engine, this injector 21 is arranged so as to inject fuel directly into the combustion chamber 18.

Furthermore, 22 is a fuel tank, 23A through 23E fuel supply paths, 24 a low-pressure fuel pump, 25 a high-pressure fuel pump, 26 a low-pressure regulator, 27 a high-pressure regulator, and 28 a delivery pipe. The fuel within the fuel tank 22 is driven with the low-pressure fuel pump 24, furthermore is pressurized with the high-pressure fuel pump 25, and is supplied in a predetermined high-pressure state to the injector 21 through the fuel supply paths 23A and 23B and the delivery pipe 28. At this time, the fuel pressure discharged from the low-pressure fuel pump 24 is regulated with the low-pressure regulator 26, and the fuel pressure, which is pressurized with the high-pressure fuel pump 25 and guided to the delivery pipe 28, is regulated with the high-pressure regulator 27.

Also, 29 is an exhaust gas recirculation passage (EGR passage) which recirculates the exhaust gas in the exhaust passage 17 of the engine 1 into the intake passage 2. 30 is a stepper motor type valve (EGR valve) as exhaust gas quantity adjustment means, which adjusts a recirculation quantity of exhaust gas that is recirculated into the intake passage 2 through the EGR passage 29. 31 is a passage for restoring blow-by gas, 32 a passage for positively ventilating the crank chamber, 33 a valve for positively ventilating the crank chamber, 34 a canister, and 35 a catalyzer for purifying exhaust gas (here, catalytic converter rhodium (CCRO)).

Incidentally, as shown in FIG. 4, the ECU 16 performs the opening and closing controls or opening degree controls of the air bypass valves 6 and 14 and, furthermore, performs the controls of the injector 21, spark wire coils (not shown) for spark plugs, and the EGR valve, and the combustion pressure control by the high-pressure regulator 27. For these controls, as shown in FIG. 4, an air flow sensor 44, an intake-air temperature sensor 26, a throttle position sensor (TPS) 37 for detecting a throttle opening degree, an idle switch (idle detection means) 38, an air-con switch (not shown), a speed change position sensor (not shown), a wheel speed sensor (not shown), a power steering wheel switch (not shown) for detecting the operating state of a power steering wheel, a starter switch (not shown), a first-cylinder detection sensor 40, a crank angle sensor 41, a water temperature sensor 42 for detecting temperature of engine cooling water, an $O_2$-sensor 43 for detecting oxygen concentration in exhaust gas, etc., are provided, and connected to the ECU 16. Note that, based on the crank angle sensor 41, engine speed can be computed and an engine speed computation function such as this is provided, for example, in the ECU 16. Hence, in this embodiment the crank angle sensor 41 is also called an engine speed sensor for convenience' sake, though the engine speed sensor is constituted by the crank angle sensor 41 and the engine speed computation function.

Now, the controlled contents regarding the engine through the ECU 16 will be described based on a control block diagram of FIG. 5.

This engine is one which switches premixed combustion and stratified lean combustion in accordance with the operating state. The premixed combustion can be established by injecting fuel evenly into the combustion chamber 18, and the stratified lean combustion can be established by causing injected fuel to be unevenly distributed around a spark plug (not shown) facing into the combustion chamber 18.

Then, this engine is provided, as engine operating modes, with a fuel cut mode in which fuel injection is cut, in addition to four fuel injection modes: late lean combustion operating mode (late lean mode) in which fuel is injected on the compression stroke to perform stratified lean combustion, early lean combustion operating mode (early lean mode) in which fuel is injected on the intake stroke to perform premixed combustion, stoichiometric feedback operating mode (stoichiometric mode), and open-loop combustion operating mode (stoichiometric mode or enrich mode).

Then, any of these modes is selected according to the operating state of the engine or the traveling state of the vehicle by this fuel control apparatus for an in-cylinder injection internal combustion engine to carry out fuel supply control. Note that in each fuel injection mode, the case that the EGR is caused to be operated and the case that the EGR is caused to be stopped are set.

Figure 1:
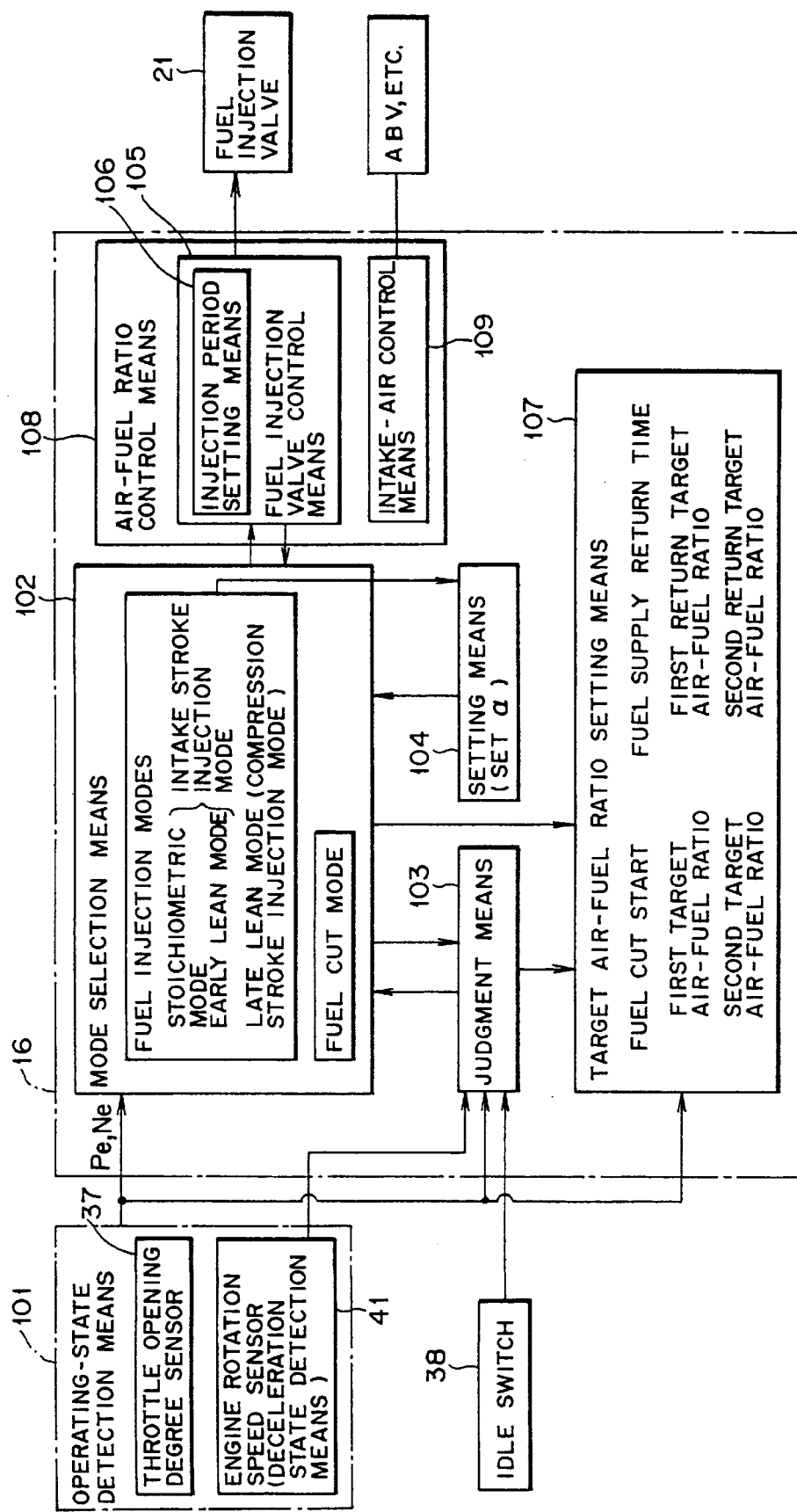
FIG. 1 is a block diagram showing the essential construction of a fuel control apparatus for an in-cylinder injection internal combustion engine as a first embodiment of the present invention.

Now, a description will be made of this fuel control apparatus for an in-cylinder injection internal combustion engine. As shown in FIG. 1, the operating states of the engine, i.e., the engine load state Pe and the engine speed Ne are input from operating-state detection means 101 to the ECU 16. The ECU 16 is provided with mode selection means 102 for selecting any of the aforementioned operating modes from the information of these operating states.

Note that as described later, since the engine load state Pe is computed based on the engine speed Ne and the throttle opening degree θth, the data of the engine operating states which are input to the ECU 16 are the engine speed Ne and the throttle opening degree θth. The operating-state detection means 101 comprises an engine speed sensor 41 and a throttle opening degree sensor 37.

Also, as shown in FIG. 1, this fuel control apparatus is provided, as the functional sections within the ECU 16, with target air-fuel ratio setting means 107 for setting a target air-fuel ratio in accordance with each operating mode and air-fuel ratio control means 108 for controlling an air-fuel ratio, based on the target air-fuel ratio set by the target air-fuel ratio setting means 107.

The target air-fuel ratio setting means 107 sets, for example, in the late lean mode an air-fuel ratio within an air-fuel area where fuel is leanest (greater by far than the stoichiometric air-fuel ratio). In the early lean mode an air-fuel ratio is set within an air-fuel area where fuel is leaner than the late lean made (to some degree greater than the stoichiometric air-fuel ratio). In the stoichiometric mode an air-fuel ratio is set so as to pulsate with an air-fuel ratio near the stoichiometric air-fuel ratio by the $O_2$-feedback control. In the enrich mode an air-fuel ratio is set within an air-fuel ratio area where fuel is rich (slightly less than the stoichiometric air-fuel ratio). In either mode other than the stoichiometric mode, a target air-fuel ratio is adjusted according to the operating state of the engine.

The air-fuel ratio control means 108 comprises fuel injection valve control means 105 for controlling the operation of the fuel injection valve 21 and intake-air control means 109 for controlling the air bypass valves (ABV, etc.), and controls an air-fuel ratio by fuel injection quantity control and intake-air quantity control.

When any of the fuel injection modes is selected, the fuel injection valve control means 105 also sets an air-fuel ratio in accordance with the engine operating states (Pe and Ne) for each of the selected operating modes and, based on the set air-fuel ratio, controls the operation of the fuel injection valve 21 provided in each of the cylinders to control fuel supply. When the fuel cut mode is selected, the fuel injection valve control means 105 cuts fuel which is supplied by the fuel injection valve 21.

Of course the control of an air-fuel ratio is not carried out by the operation of the fuel injection valve 21 but it is also carried out along with the opening and closing controls or opening degree controls of the air bypass valves 6 and 14. Particularly, at the time of the late lean mode (lean compression mode), air is supplied through the air bypass valve 6 to supplement intake air that becomes insufficient by regulation of the throttle valve, thereby achieving a great air-fuel ratio.

Specifically, the fuel injection valve control means 105 sets the drive period of the fuel injection valve 21, i.e., the fuel injection period (injector pulse width), and outputs a drive command signal to the fuel injection valve 21 in accordance with this setting. For this reason, the fuel injection valve control means 105 is provided with injection period setting means 106 for setting a fuel injection period. Note that the fuel injection valve control means 105 does not set only a period for injecting fuel, but it also specifically sets the start timing and end timing of the fuel injection so that the fuel injection is performed at optimum timing.

The cases where the mode selection means 102 selects the fuel cut mode, incidentally, are the following cases:

(1) Case where a first predetermined period N1IG elapses after the judgment means 103 shown in FIG. 1 has judged that fuel cut conditions have been established and also the fuel injection period set by the injection period setting means of the fuel injection valve control means 105 is less than a predetermined injection period.

(2) Case where the first predetermined period N1IG elapses after the judgment means 103 shown in FIG. 1 has judged that fuel cut conditions have been established, but the state, in which the fuel injection period set by the injection period setting means of the fuel injection valve control means 105 is not less than the predetermined injection period, continues only for a second predetermined period after fuel cut conditions have been established.

Also, the case where the mode selection means 102 selects the engine operating mode so that it returns from the fuel cut mode to the fuel supply mode is one where the judgment means 103 shown in FIG. 1 judges that release of fuel cut has been established.

Note that, based on detection information from the engine speed sensor 41 and the idle switch 38, the judgment means 103 judges that fuel cut conditions have been established, when the engine speed Ne is equal to or greater than a predetermined speed Ne1 and also the idle switch 38 outputs an idle command signal corresponding to a nearly fully closed state of the throttle valve.

Also, the reason why there is a wait for the elapse of the first predetermined period N1IG after the judgment means 103 has judged that fuel cut conditions have been established is for confirming that the throttle valve has been fully closed, and fuel cut is prohibited during the first predetermined period N1IG after the engine has gone from a non-idle state to an idle state. Note that the first predetermined period N1IG is set to a sufficiently short period (8 through 16 IG, for example).

In other words, if the first predetermined period N1IG elapses after the judgment means 103 has judged that fuel cut conditions have been established, then the mode selection means 102 will monitor the fuel injection period set by the injection period setting means 106 and select the fuel cut mode in the case where this fuel injection period is less than a predetermined injection period $\alpha$. Also, even if the fuel injection period is not less than a predetermined injection period $\alpha$ after the judgment means 103 has judged that fuel cut conditions have been established, the mode selection means 102 will select the fuel cut mode if a previously set period (second predetermined period) N2IG elapses. Note that the second predetermined period N2IG is set to a period (64 IG, for example) longer than the first predetermined period N1IG.

That is, even if fuel cut conditions are established and the first predetermined period N1IG elapses, fuel cut is not performed until the fuel injection period becomes less than the predetermined injection period $\alpha$ or the second predetermined period N2IG elapses. The reason why there is a wait until the fuel injection period becomes less than the predetermined injection period $\alpha$ is that the occurrence of a torque shock is suppressed when a transition to a fuel cut mode is made, by performing the fuel cut after the output torque produced by combustion in the engine has become sufficiently small.

Also, the reason that if the second predetermined period N2IG elapses, fuel cut will be performed even if the fuel injection period is not less than the predetermined injection period $\alpha$ is that acquisition of a low fuel consumption effect or an engine brake effect by fuel cut is caused to be prior to suppression of torque shock occurrence. In practice, it is believed that the fuel injection period often becomes less than the predetermined injection period $\alpha$ before the second predetermined period N2IG elapses.

The predetermined injection period $\alpha$, incidentally, is set according to the engine operating mode (fuel injection mode) by the ECU 16. This period $\alpha$ is set to a sufficiently small value so that a torque shock can be suppressed. In the compression stroke injection mode such as the late lean mode, since boost pressure is also low and engine output torque is small, the fuel injection period will become less than the predetermined injection period $\alpha$ quickly (within the second predetermined period N2IG) even if the predetermined injection period $\alpha$ is set relatively small. However, in the intake stroke injection mode such as the early lean mode or the stoichiometric mode, since boost pressure is high and combustion efficiency is not good with respect to the compression stroke injection mode, the fuel injection period will not be less than the predetermined injection period $\alpha$ quickly (within the second predetermined period N2IG) if the predetermined injection period $\alpha$ is set relatively small. Hence, in the case of the intake stroke injection mode, the predetermined injection period $\alpha$ is set relatively great so that a suppression effect of torque shock occurrence and a fuel cut effect are balanced with each other. In the case of the compression stroke injection mode, the predetermined injection period $\alpha$ is set relatively small so that a fuel cut effect is also obtainable, obtaining a sufficient suppression effect of torque shock occurrence.

Furthermore, in this apparatus, the air-fuel ratio control is performed so that the fuel injection period becomes less than the predetermined injection period $\alpha$ quickly and smoothly. In other words, the target air-fuel ratio setting means 107 sets a target air-fuel ratio in accordance with each operating mode, but, in the case of the compression stroke injection mode (i.e., late lean mode), the target air-fuel ratio setting means 107 will set a target air-fuel ratio during non-idling as well as during idling so that an air-fuel ratio is gradually increased, if the judgment means 103 judges that the engine is in a deceleration state.

In other words, from the crank angle sensor 41 as the engine speed detection means, it can be judged whether or not the engine is in a deceleration state. Therefore, based on information from this crank angle sensor 41 as the engine speed detection means, if the engine is in a deceleration state, the target air-fuel ratio setting means 107 will set a first target air-fuel ratio during non-idling so that an air-fuel ratio is gradually increased, and also set a second target air-fuel ratio during idling so that the target air-fuel ratio gradually approaches the second target air-fuel ratio.

That is, if the engine is in a non-idle state during engine deceleration, the target air-fuel ratio (first target air-fuel ratio) AF1 will be set so that it is gradually leaned according to the deceleration state from the air-fuel ratio corresponding to the operating state, and a target air-fuel for each control cycle will be set to the first target air-fuel ratio AF1 which is gradually leaned in this way, thereby performing the air-fuel ratio control.

In this manner, even if the engine is in a non-idle state during engine deceleration, the engine output torque will be reduced, and thereafter, in the case where the engine goes to an idle state (therefore, in the case where fuel cut conditions are established), a transition to a fuel cut mode can be quickly performed without a torque shock. Of course, since this reduction in the output torque by the increase in the air-fuel ratio is not suddenly performed, there is no possibility that the driver, etc., will have a feeling of physical disorder.

Also, if the engine goes to an idle state during engine deceleration, the second target air-fuel ratio (i.e., an air-fuel ratio even higher than the first target air-fuel ratio) AF2 will be set so that the output torque of the engine will be further reduced, and a target air-fuel ratio for each control cycle will be set so that it gradually approaches this second target air-fuel ratio AF2. In this way, in the case where the engine goes to an idle state during engine deceleration and also fuel cut conditions are established, the engine output torque can be sufficiently reduced, and the transition to a fuel cut mode thereafter can be performed without a torque shock. Note that in the intake stroke injection mode in which a target air-fuel ratio is controlled in the vicinity of the stoichiometric air-fuel ratio, the quantity of fuel injection which is supplied with the second target air-fuel ratio AF2 is set to a small quantity of fuel injection so that irregular combustion such as accidental fire takes place.

Note that in this case, at the time the engine has gone to an idle state during engine deceleration, an actual air-fuel ratio must have been increased to a third target air-fuel ratio AF2' on a richer side than the second target air-fuel ratio AF2, for the reason that deceleration is great and other reasons. First, after an air-fuel ratio has been increased instantly to the third target air-fuel ratio AF2', a target air-fuel ratio for each control cycle is set so that it gradually approaches the second target air-fuel ratio AF2 even higher than the third target air-fuel ratio. The third target air-fuel ratio AF2' needs to be set to a value so that it causes a feeling of deceleration but does not cause a shock (feeling of physical disorder), thus by increasing the air-fuel ratio instantly at the time the engine has gone to an idle state.

If the target air-fuel ratio is set in this manner, the engine output torque can be sufficiently reduced, and the transition to a fuel cut mode thereafter can be quickly performed without a torque shock. In addition, since such a reduction in the output torque by the increase in the air-fuel ratio is not suddenly performed, there is no possibility that the driver, etc., will have a feeling of physical disorder.

In this apparatus, on the other hand, air-fuel ratio control is performed at the time of a return from a fuel cut mode to a fuel injection mode as well. In other words, the mode selection means 102 is set so that it performs a return from a fuel cut mode to a fuel supply mode, if a return condition to a fuel supply mode (fuel injection return conditions) is established during a fuel cut mode. This fuel injection return condition is the case where a transition from an idle state to a non-idle state is made or the case where engine speed is reduced to less than a predetermined speed (fuel injection return condition speed) Ne2 (Ne2<Ne1) even if an idle state continues.

This target air-fuel ratio setting means 107 compares the magnitude $|\Delta Ne|$ of a change rate (actually a reduced speed) $\Delta Ne$ in the engine speed Ne with a predetermined value $\beta$ when this return to a fuel supply mode is performed. If $|\Delta Ne|$ is less than the predetermined value $\beta$ (i.e., if a degree of deceleration is slight), a relatively lean second return target air-fuel ratio (less than a stoichiometric air-fuel ratio) B (=AF4) will be set. If $|\Delta Ne|$ is equal to or greater than the predetermined value $\beta$ (i.e., if a degree of deceleration is great), a relative rich first return target air-fuel ratio A (=AF3) will be set. In either case, fuel supply is started with the return target air-fuel ratio A or B at the time of a return to a fuel supply mode, but, particularly, in the case where the return target air-fuel ratio B is set, the return target air-fuel ratio thereafter is gradually reduced toward the target air-fuel ratio A on a fuel-enriched side. Note that in the intake stroke injection mode in which a target air-fuel ratio is controlled in the vicinity of a stoichiometric air-fuel ratio, the injection quantity of fuel which is supplied with the fourth target air-fuel ratio AF4 is set so that irregular combustion such as misfire takes place.

The reasons why different target air-fuel ratios are thus set according to the change rate in the engine speed Ne, i.e., the degree of deceleration are as follows: When the engine speed Ne is decreasing suddenly, the speed reduction cannot be prevented if an increase in the engine torque is insufficient. Therefore, the relatively rich target air-fuel ratio A is set so that the reduction can be avoided, and thereafter, the air-fuel ratio is controlled toward the original air-fuel ratio quickly and smoothly. If the reduction in the engine speed Ne is gentle, a sudden increase in the engine torque will cause a torque shock. Therefore, the relatively lean target air-fuel ratio B is set and fuel supply is returned without causing a torque shock. Thereafter, the return target air-fuel ratio is gradually reduced toward the target air-fuel ratio A on a fuel-enriched side, whereby the air-fuel ratio is controlled toward the original air-fuel ratio quickly and smoothly.

Figure 2:
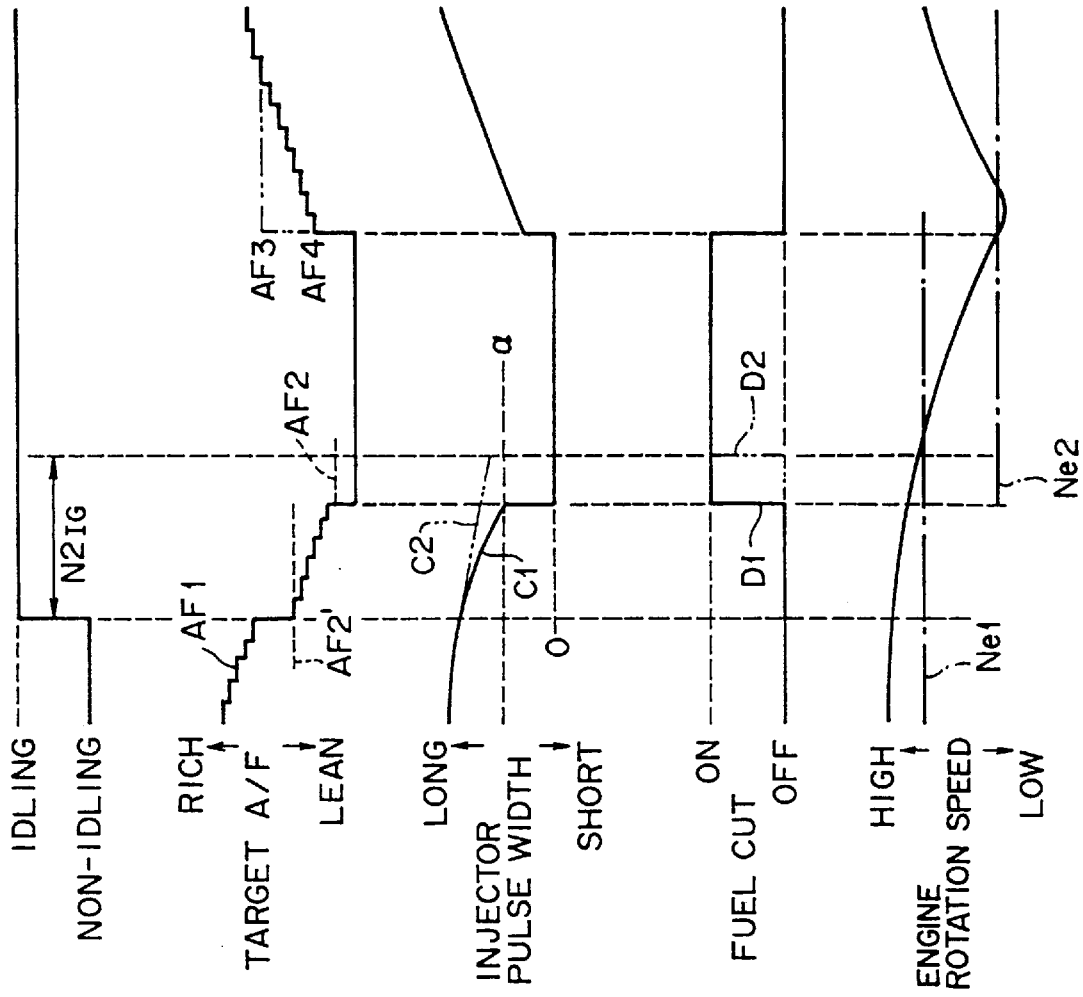
FIG. 2 is a timing chart describing the control of the fuel control apparatus for an in-cylinder injection internal combustion engine as the first embodiment of the present invention, (A) showing whether or not the engine is in an idle state, (B) showing a target air-fuel ratio, (C) showing an injector pulse width (fuel injection time), (D) showing a fuel cut state, and (E) showing engine speed.

If the specific examples of such a transition to a fuel cut mode and such a return to a fuel supply mode are described, they will become as shown in FIG. 2.

In other words, if the engine goes to a deceleration state during a non-idle state, the target air-fuel ratio AF1 will first be set so that it is gradually leaned according to the deceleration state from the air-fuel ratio corresponding to the operating state (see FIG. 2(B)), and a target air-fuel ratio for each control cycle will be set to the first target air-fuel ratio AF1 which is thus gradually leaned, thereby performing the air-fuel ratio control.

During such air-fuel ratio control, as shown in FIG. 2, if the engine makes a transition from a non-idle state to an idle state (see FIG. 2(A)) under the condition the engine speed Ne is equal to or greater than a predetermined speed Ne1 (see FIG. 2(E)), a target air-fuel ratio will first be changed instantly to the third target air-fuel ratio AF2' and then a target air-fuel ratio for each control cycle will be set so that it gradually approaches the second target air-fuel ratio AF2, thereby performing the air-fuel ratio control (see FIG. 2(B)).

On the other hand, along with this, a predetermined injection period $\alpha$ is set in accordance with the fuel injection mode at this time (here, the late lean mode in which fuel is injected on a compression stroke), and then whether or not the fuel injection period is less than the predetermined injection period $\alpha$ is monitored (see a solid line C1 of FIG. 2(C)). Then, with the aforementioned air-fuel control, the fuel injection period is reduced quickly and smoothly, and if the fuel injection period is less than the predetermined injection period $\alpha$, the fuel cut mode will be selected and the fuel cut control will be switched from an OFF state to an ON state, thereby executing the fuel cut (see a solid line D1 of FIG. 2(D)). In addition, after the transition from a non-idle state to an idle state (i.e., after the fuel cut conditions have been established), a timer is started to count a period which is present after the transition to the idle state (here, it is counted as a number of ignitions and the unit is referred to as "IG"). Even if the fuel injection period is not less than the predetermined injection period $\alpha$ (see a chain line C2 of FIG. 2(C)), the fuel cut mode will be selected and fuel cut will be executed, if the second predetermined period N2IG elapses after the fuel cut conditions have been established (see a chain line D2 of FIG. 2(D)).

Then, with such fuel cut, the engine speed Ne is gradually reduced. If the engine speed is reduced to less than the predetermined speed (fuel injection return condition speed) Ne2 even if the idle state continues (see FIG. 2(E)), then the magnitude $|\Delta Ne|$ of the change rate $\Delta Ne$ in the engine speed Ne at this time will be compared with a predetermined value $\beta$. If $|\Delta Ne|$ is less than the predetermined value $\beta$ (i.e., if a degree of deceleration is slight), a relatively lean return target air-fuel ratio B (=AF4) will be set. If $|\Delta Ne|$ is equal to or greater than the predetermined value $\beta$ (i.e., if a degree of deceleration is great), a relatively rich return target air-fuel ratio (less than a stoichiometric air-fuel ratio) A (=AF3) will be set (see FIG. 2(B)). At the time of a return to a fuel supply mode, fuel supply is started with these target air-fuel ratios. Particularly, if the return target air-fuel ratio B (=AF4) is set, the target air-fuel ratio thereafter will be gradually reduced toward the target air-fuel ratio A (=AF3) on a fuel-enriched side.

Although the return target air-fuel ratio A (=AF3) has been set as the target air-fuel ratio for normal idle running, the return target air-fuel ratio A may be set to a value lower than the target air-fuel ratio for normal idle running (of course an air-fuel ratio higher than the return target air-fuel ratio B), and thereafter, the target air-fuel ratio may be gradually reduced and returned to the target air-fuel ratio for normal idle running. In other words, if a sudden increase in the output is performed when a degree of deceleration is great, the engine speed will be returned, but a torque shock will easily occur. However, if a target air-fuel ratio is reduced stepwise in this manner, the engine speed can be returned avoiding a torque shock, as with the control in the case of a small degree of deceleration. Furthermore, such an advantage is obtainable with relatively simple control logic. The return target air-fuel ratio in this case needs be set to one which can return engine speed and also avoid a torque shock.

Figure 6:
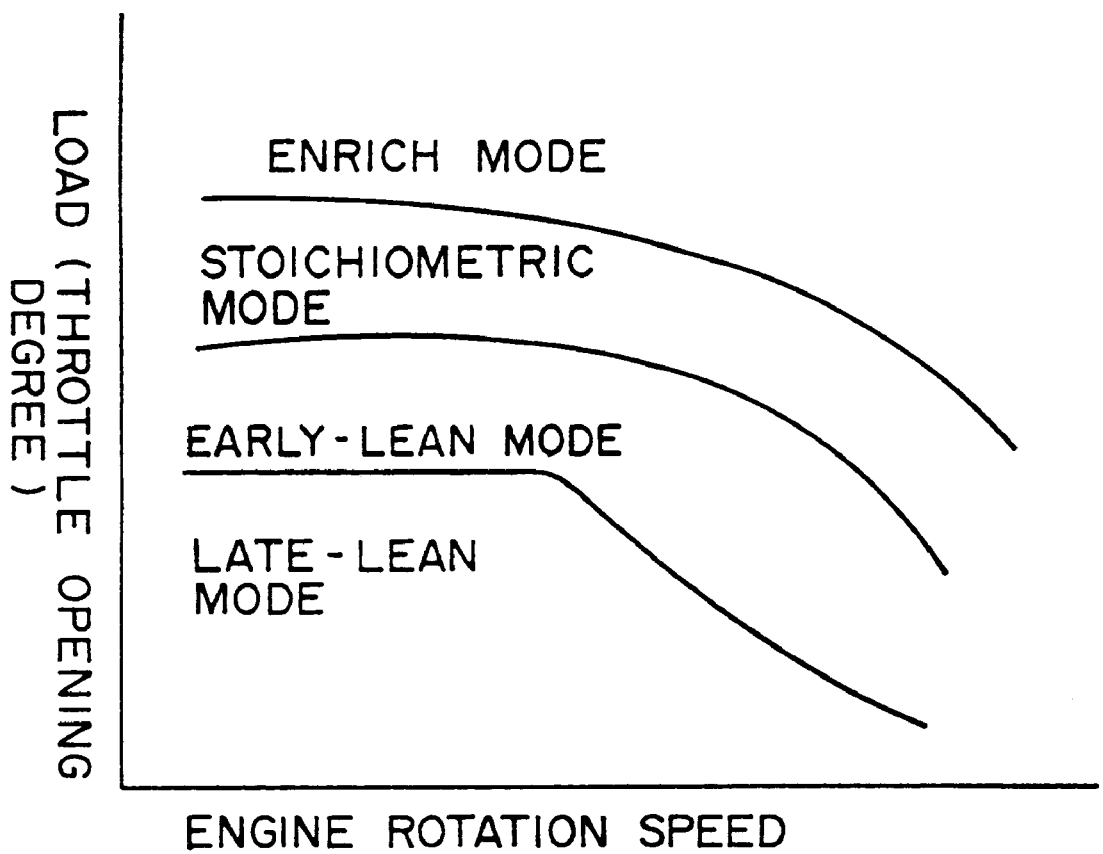
FIG. 6 is a diagram explaining the operating modes of the in-cylinder injection internal combustion engine according to the first embodiment of the present invention.
Figure 7:
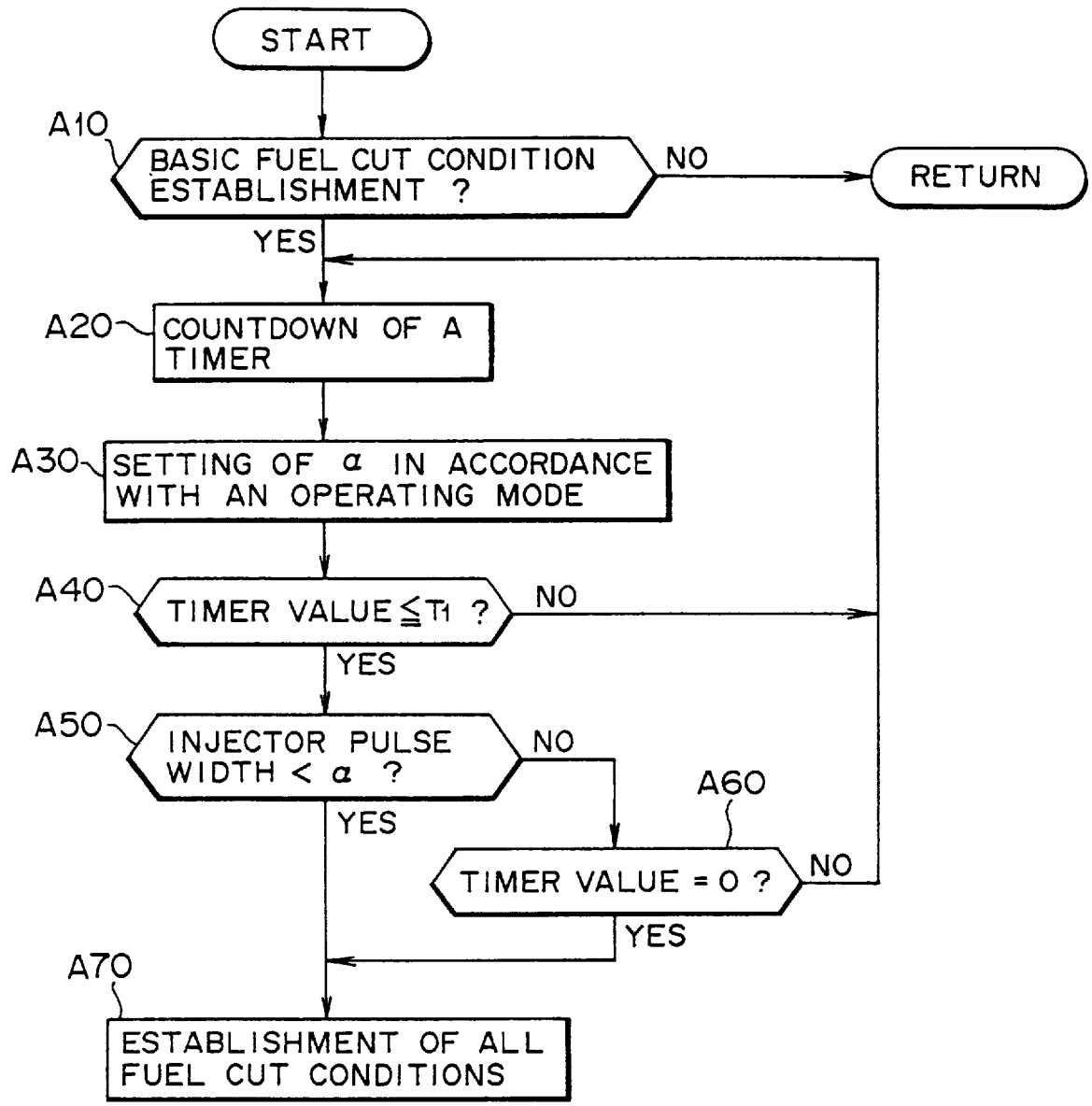
FIG. 7 is a flowchart describing the control operation of the fuel control apparatus for an in-cylinder injection internal combustion engine as the first embodiment of the present invention.

If a further description is made of the fuel injection modes, in the mode setting in the fuel injection modes, an enrich operating mode, a stoichiometric operating mode, an early lean mode, and a late lean mode are generally set with respect to the engine speed Ne and the engine load Pe with an area tendency such as that shown in FIG. 6.

Also, among the aforementioned fuel injection modes, the late lean mode can realize the leanest combustion (air-fuel ratio: approximately 30 through 40), and in this mode, the fuel injection is performed at a stage extremely close to an ignition period, like the later stage of a compression stroke. Furthermore, fuel is collected near the spark plug to cause the air-fuel ratio to be rich partially and lean as a whole, whereby economical operation is performed ensuring ignitability and combustion stability.

Then, the early lean mode can also realize lean combustion (air-fuel ratio: approximately 20 through 24), and in this mode, the fuel injection is performed at the intake stroke before the late lean mode. Fuel is diffused into the combustion chamber to cause the entire air-fuel ratio to be lean, and a certain degree of output is ensured while ensuring ignitability, thereby performing economical operation.

The stoichiometric operating mode is made so that sufficient engine output is efficiently obtained, maintaining an air-fuel ratio at a stoichiometric state or a state close to the stoichiometric state, based on the output of the $O_2$-sensor.

Also, in the open-loop combustion operating mode, combustion is performed at an stoichiometric air-fuel ratio or an air-fuel ratio richer than this by open-loop control so that sufficient output is obtained at the time of acceleration or start.

First, if a description is made of the opening and closing controls of the valves 6 and 14, the ECU 16 is provided with a function of setting a request air quantity in accordance with an engine operating state, and the opening and closing controls of the valves 6 and 14 are performed according to the set request air quantity.

Figure 5:
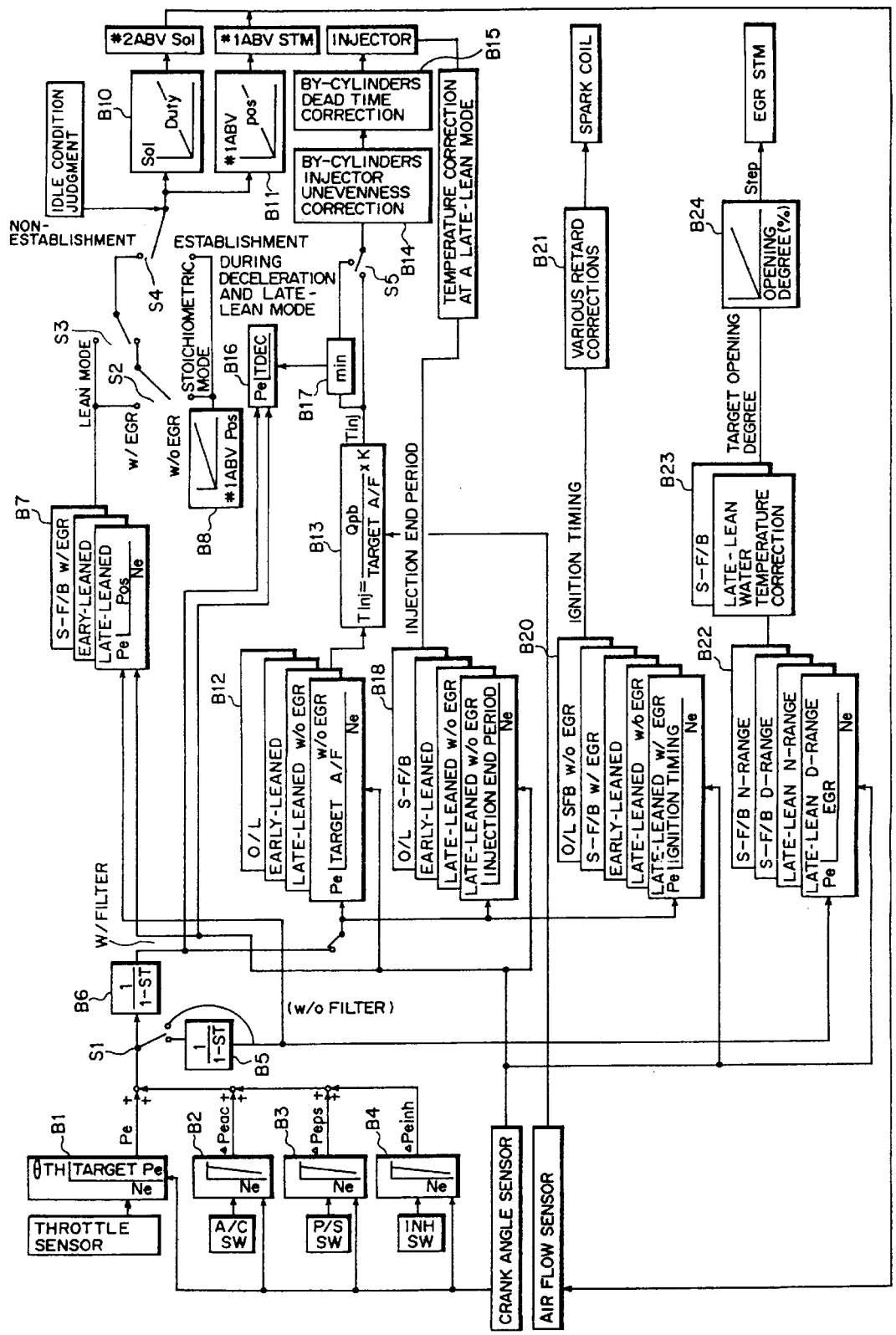
FIG. 5 is a control block diagram of the in-cylinder injection internal combustion engine according to the first embodiment of the present invention.

Specifically, as shown in FIG. 5, from the throttle opening degree θth detected by the throttle sensor or the engine speed Ne based on both the output of the accelerator opening degree sensor (not shown) and the detection information from the crank angle sensor, target engine load (target Pe) is first set based on the map (block B1).

If, on the other hand, the air conditioner is on, based on information from the air-conditioner switch, an air-conditioner corresponding correction quantity Δ Peac will be set from the engine speed Ne, based on the map (block B2). If the power steering wheel is on, based on information from the power steering wheel switch, a power steering wheel corresponding correction quantity Δ Peps will be set from the engine speed Ne, based on the map (block B3). Based on information from the inhibitor switch, an inhibitor corresponding correction quantity Δ Peinh will be set from the engine speed Ne at the time of the start, based on the map (block B4).

Then, with these corresponding correction quantities Δ Peac, Δ Peps, and Δ Peinh, the target Pe is corrected properly. Then, after this correction the target Pe is filtered properly through the switch S1 (block B5). From the thus obtained target Pe and engine speed Ne, a control quantity Pos for a valve opening degree corresponding to the request air quantity (or a target intake-air quantity) Q is set based on the map.

In setting this control quantity Pos, a map corresponding to an engine operating state is selected from a plurality of maps shown in block B7 and employed. Through switches S2 and S3, a signal is output in accordance with an engine operating state. Here, as the engine operating state, maps are provided with respect to three modes: late lean mode in which the leanest combustion is carried out, early lean mode in which the second leanest combustion is carried out, and EGR in motion in a stoichiometric operating mode. The request air quantity is set only in the case of these modes.

Also, in the case where an idle operating state is established, the control quantity #1ABVPos of the request air quantity (or target intake-air quantity) #1ABVQ is set based on the feedback control of engine speed by a switch S4, as shown in block B8. In this case the control quantity #1ABVPos becomes a target opening degree based mainly on the #1ABV valve.

The functional section for setting quantities corresponding to the request air quantities Q and #1ABVQ through the aforementioned blocks B7 and B8 corresponds to request air quantity setting means (not shown).

In accordance with the thus obtained control quantity Pos or #1ABVPos, the setting of the opening degree position of the air bypass valve 6 or the setting of a duty ratio is performed (block B10) and the setting of the opening degree position of the air bypass valve 14 is performed (block B11), whereby the air bypass valves 6 and 14 are controlled at required states.

Furthermore, based on FIG. 5, a description will be made of each control of the injector, the spark plug, and the EGR.

In order to drive the injector, there is a need to set the injection start period and injection end period of the injector, but, in this embodiment, injector drive time Tinj and the injection end period of the injector are set, and based on these, the timing for driving the injector is determined calculating backward the injection start of the injector. The settings of these are performed according to the operating state of the engine by the ECU 16.

In the setting of the injector drive time Tinj, an air-fuel ratio A/F is first set from the corrected target Pe and engine speed Ne given or obtained from the filtering process (block B6), based on the map (block B12). Similarly, the setting maps in this case are provided with respect to four modes: EGR in motion in a late lean mode, EGR in stop in a late lean mode, early lean mode, and open-loop mode. The modes are selected according to the operating state of the engine and employed.

From the thus obtained air-fuel ratio A/F and an intake-air quantity Qpb detected by the air flow sensor, the injector drive time Tinj is computed (block B13).

Then, this injector drive time Tinj is given by-cylinders injector unevenness rate correction (block B14) and by-cylinders dead time correction (block B15). On the other hand, from the target Pe and the engine speed Ne, injection time TDEC for deceleration is computed (block B16). At the time of the deceleration of the engine and at the time of the late lean operating mode, a smaller time between the injector drive time Tinj obtained in block B13 and the deceleration injection time TDEC is selected through a switch S5 (block B17), and this is decided as the injector drive time.

Similarly, in the setting of the injection end period of the injector, the injection end period is set from the corrected target Pe and engine speed Ne given or obtained from the filtering process (block B6), based on the map (block B18). The setting maps in this case are also provided with respect to four modes: EGR in motion in a late lean mode, EGR in stop in a late lean mode, early lean mode, and open-loop operating mode or stoichiometric feedback operating mode. The modes are selected according to the operating state of the engine and employed.

In the case of the late lean mode, the thus obtained injection end period is given water temperature correction, thereby obtaining a corrected injection end period.

Based on the thus obtained injector drive time Tinj and injection end period, the injector is driven.

Also, for the ignition period of the spark plug by the spark coil, the ignition period is set from the corrected target Pe and engine speed Ne given or obtained from the filtering process (block B6), based on the map (block B20). The setting maps in this case are provided with respect to five modes: EGR in motion in a late lean mode, EGR in stop in a late lean mode, early lean mode, EGR in motion in a stoichiometric feedback operating mode, and EGR in stop in an open-loop operating mode or stoichiometric feedback operating mode. The thus obtained ignition period is given various retard corrections (block B21), and based on this, control of the spark coil is performed.

Also, for the flow control of the EGR, the flow rate of the EGR is set from the corrected target Pe and engine speed Ne given or obtained form the filtering process (block B6), based on the map (block B22). The setting maps in this case are provided with respect to four modes: late lean mode in a D range, late lean mode in an N range, stoichiometric feedback operating mode in a D range, and stoichiometric feedback operating mode in an N range.

The thus obtained flow rate of the EGR is given water temperature correction (block B23), and a control quantity (duty ratio) corresponding to an opening degree is set (block B24), thereby performing the flow control of the EGR. Note that the water temperature correction (block B23) also employs maps corresponding to engine operating states (here, two modes: late lean mode and stoichiometric feedback operating mode).

Figure 3:
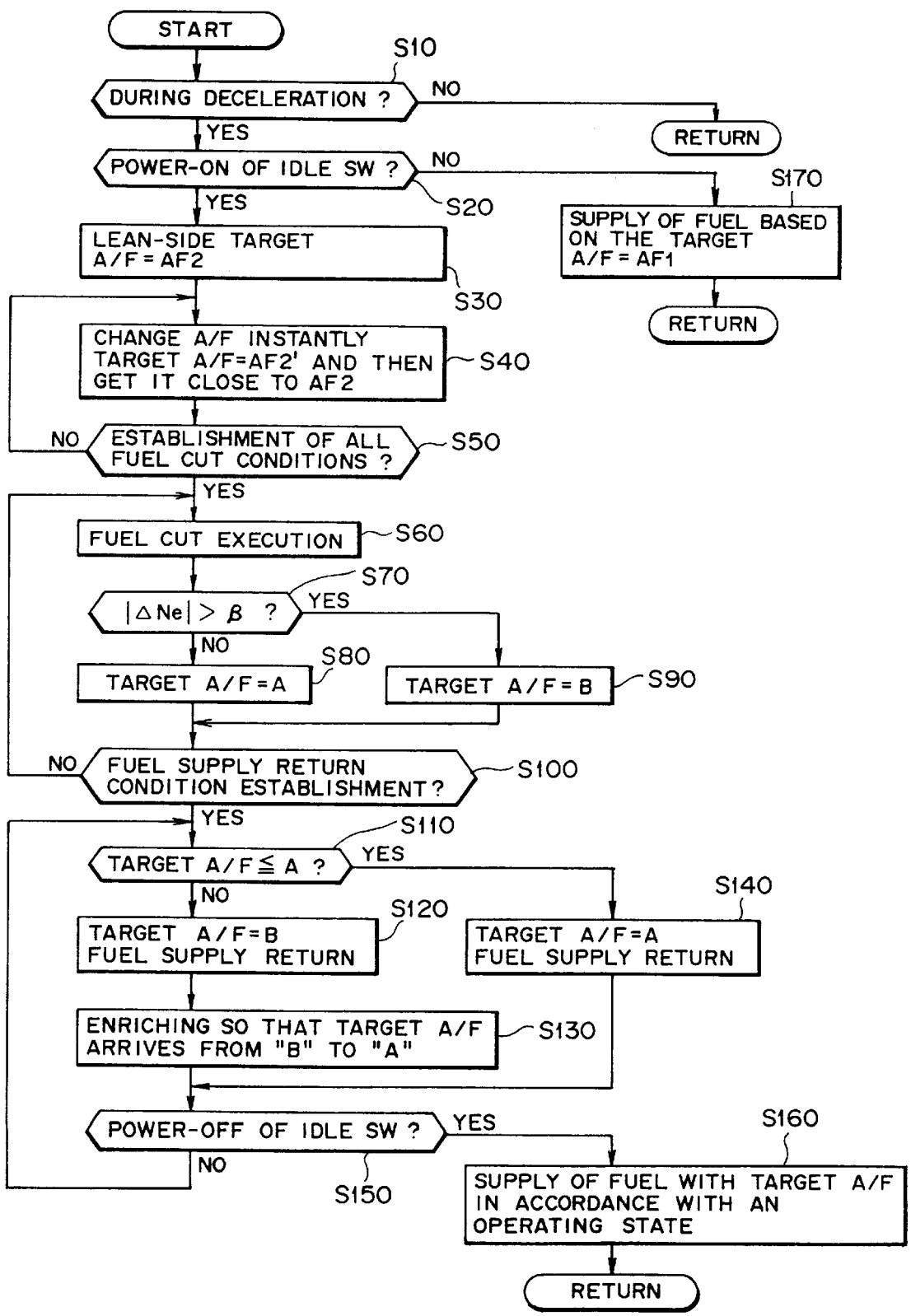
FIG. 3 is a flowchart describing the control operation of the fuel control apparatus for an in-cylinder injection internal combustion engine as the first embodiment of the present invention.

Since the fuel control apparatus for an in-cylinder injection internal combustion engine as the first embodiment of the present invention is constructed as described above, the fuel control is performed, for example, as shown in FIG. 3.

In other words, initially the judgment means 103 judges whether or not the engine is in deceleration (step S10). If it is in deceleration, then the judgment means 103 judges whether or not the fuel cut conditions have been established, i.e., whether or not the engine is in an idle state, from whether or not the idle switch is on (step S20). If it is in a non-idle state, the first target air-fuel ratio will be set so that it is gradually leaned according to the deceleration state from the air-fuel ratio corresponding to the operating state, and a target air-fuel ratio for each control cycle will be set so that it gradually approaches this first target air-fuel ratio AF1, thereby controlling the fuel supply (step S170). In this manner, the output torque of the engine is reduced.

At the time of such target air-fuel ratio control, as shown in FIG. 2, if the engine makes a transition from a non-idle state to an idle state (see FIG. 2(A)) under the condition the engine speed Ne is equal to or greater than a predetermined speed Ne1 (see FIG. 2(E)), a target air-fuel ratio will first be changed instantly to the third target air-fuel ratio AF2' and then a target air-fuel ratio for each control cycle will be set so that it gradually approaches the second target air-fuel ratio AF2, thereby controlling the air-fuel ratio control (see FIG. 2(B)).

In this manner, even if the engine is in a non-idle state at the time of deceleration, the output torque of the engine will be reduced, and thereafter, in the case where the engine makes a transition to an idle state (therefore, in the case where fuel cut conditions are established), a transition to a fuel cut mode can be made without a torque shock, and since this reduction in the output torque by the increase in the air-fuel ratio is not suddenly performed, there is no possibility that the driver, etc., will have a feeling of physical disorder.

Also, if the engine goes to an idle state at the time of the deceleration, step S20 will advance to step S30 and the second target air-fuel ratio (i.e., an air-fuel ratio even higher than the first target air-fuel ratio) AF2 will be set so that the output torque of the engine will be further reduced.

Then, at the time the engine has gone to an idle state during the acceleration of the engine, if an actual air-fuel ratio has not been increased to the third target air-fuel ratio AF2' on a richer side than the second target air-fuel ratio AF2, an air-fuel ratio will first be increased instantly to this third target air-fuel ratio AF2' and then a target air-fuel ratio for each control cycle will be set so that it gradually approaches the second target air-fuel ratio AF2 even higher than the third target air-fuel ratio, thereby performing control (step S40).

Note that the third target air-fuel ratio AF2', by thus increasing an air-fuel ratio instantly at the time the engine has gone to an idle state, causes a feeling of deceleration but does not cause a feeling of shock (physical disorder). Also, if the target air-fuel ratio is thus set, the output torque of the engine can be sufficiently reduced and a transition to a fuel cut mode thereafter can be quickly performed without a torque shock. Since such a reduction in the output torque by the increase in the air-fuel ratio is not suddenly performed, there is no possibility that the driver, etc., will have a feeling of physical disorder.

For such setting of the third target air-fuel ratio AF2', if a degree of deceleration is great, a torque shock will be in a direction where it is difficult to occur, even if an air-fuel ratio is leaned, and therefore, a relatively great air-fuel ratio can be set to the third target air-fuel ratio AF2'. According to the third target air-fuel ratio AF2' such as this, if the arrival time to the second target air-fuel ratio AF2 is shortened by leaning an air-fuel ratio, a reduction in fuel consumption can be even further enhanced without deteriorating combustion.

Then, it is judged whether or not all fuel cut conditions have been established (step S50). This judgment is performed based on the result of a judgment process such as that shown in a flowchart of FIG. 7. As shown in the figure, it is first judged whether or not a basic fuel cut condition has been established (step A10). This basic fuel cut condition is one where the engine is in deceleration and also in an idling state (idle switch SW is on), and corresponds to the aforementioned steps S10 and S20 of FIG. 3.

If the basic fuel cut condition is established, the countdown by the timer will be started (step A20). This count will be started concurrently when the aforementioned step S30 of FIG. 3 advances to step S40 and a control of getting the target A/F close to the AF2 is stared. In this step A20 the initial value T0 of the timer count, set according to the second predetermined period N2IG, is subtracted with a predetermined countdown unit.

Next, the setting means 104 sets the aforementioned predetermined injection period α in accordance with the operating mode at this time (fuel injection mode) (step A30).

Then, in step A40 it is judged whether or not the value of the timer (countdown value of the timer) has reached a predetermined value T1 (corresponding to the elapse of the first predetermined period N1IG). If the value of the timer does not reach the predetermined value T1, steps A20 through A40 will be repeated, and the predetermined injection period α will be updated, confirming whether or not fuel cut conditions have been established. If the value of the timer has reached the predetermined value T1, step A40 will advance to step A50 and it will be judged whether or not the fuel injection period (injector pulse width) is less than the predetermined injection period α.

If the fuel injection period (injector pulse width) is less than the predetermined injection period α, step A50 will advance to step A70 and it will be assumed that all fuel cut conditions have been established. Also, even if the fuel injection period (injector pulse width) is not less than the predetermined injection period α, it will be assumed that all fuel cut conditions have been established (step A70), if the timer value has reached 0 (if the second predetermined period N2IG elapses), by the judgment in step A60 of whether or not the timer value (countdown value of the timer) has reached 0 (corresponding to the elapse of the second predetermined period N2IG).

Based on the result of such a judgment process according to fuel cut conditions, the judgment in step S50 of FIG. 3 is performed, and in this step S50, if it is judged that all fuel cut conditions have been established, the process will advance to step S60 and fuel cut will be executed.

At the time of this fuel cut, initially the magnitude |ΔNe| of a change rate ΔNe in the engine speed Ne is compared with a predetermined value β and judged (step S70). If this |ΔNe| is less than the predetermined value β (i.e., if a degree of deceleration is slight), a relatively lean second return target air-fuel ratio (less than a stoichiometric air-fuel ratio) B (=AF4) will be set (step S90). If |ΔNe| is equal to or greater than the predetermined value β (i.e., if a degree of deceleration is great), a relatively rich return target air-fuel ratio (less than a stoichiometric air-fuel ratio) A (=AF3) will be set (step S80).

Subsequently, it is judged whether or not fuel supply return conditions have been established (on the assumption that an idle state has continued) (step S100). Until the fuel supply return conditions are established, the return target air-fuel ratio B is properly varied by the process of steps S60 through S90.

Then, if the fuel supply return conditions have been established, it will be judged whether or not the target air-fuel ratio (A/F) of the control cycle is less than A (step S110). If the return target air-fuel ratio is B, step S110 will advance to step S120 through an No route and fuel supply will be returned with the return target air-fuel ratio as B. Furthermore, a target air-fuel ratio is adjusted gradually toward a rich side (enriched side) so that the return target air-fuel ratio approaches A (step S130).

If the return target air-fuel ratio is B, the target air-fuel ratio (A/F) will become less than A through such a process. If the return target air-fuel ratio is A, the target air-fuel ratio (A/F) will become less than A through such a process. Thereafter, with the target air-fuel ratio (A/F) as A, the process waits for a return from an idle state to a non-idle state and it is judged whether or not the engine is in a non-idle state (step S150). Then, if the engine is in a non-idle state, the engine will be returned to a normal operation (an operation independent of fuel cut) and a target air-fuel ratio corresponding to an operating state will be set, thereby performing operation (step S160).

In this manner, in this apparatus, both at the time of a transition to a fuel cut mode and at the time of a return from a fuel cut mode to a fuel supply mode, engine torque is adjusted by air-fuel ratio control. Therefore, the switching between a fuel cut mode and a fuel injection mode can be performed without causing a torque shock. At the same time, since the fuel cut control is performed after the fuel injection period (injector pulse width) has been less than this predetermined injection period α, a transition to a fuel cut mode is made after the torque produced by the engine has been reduced to some degree. Therefore, a transition to a fuel cut mode can be made, suppressing a torque shock at the time of the transition to a fuel cut mode. Furthermore, in the case where the fuel injection period (injector pulse width) will not easily become less than the predetermined injection period α, the fuel cut control is performed at the time the second predetermined period N2IG has elapsed. Therefore, in this case, suppression of a torque shock cannot be sufficiently performed when a transition to a fuel cut mode is made, but, since the injector pulse width has been less than the pulse width of the first predetermined period N1IG, a certain degree of shock can be reduced and fuel cut effects, i.e., a fuel consumption saving effect and an engine brake effect are obtainable with reliability.

Now, a second embodiment will be described in reference to FIG. 8.

As shown in FIG. 8, this embodiment is different in the control immediately before a transition to the fuel cut mode from the first embodiment. In other words, in this embodiment, if the engine is decelerated during non-idling, as with the first embodiment, the first target air-fuel ratio (i.e., a high air-fuel ratio) AF1 will be set so that the output torque of the engine is reduced. The target air-fuel ratio for each control cycle is set so that it gradually approaches the first target air-fuel ratio AF1, and the fuel supply is controlled. However, thereafter, if the engine goes to an idle state during deceleration, the operating mode (fuel injection mode) will switched from the compression stroke injection mode (late lean mode) to the intake stroke injection mode (stoichiometric mode or early lean mode).

If the operating mode is thus switched to the intake stroke injection mode, the output torque of the engine will easily be reduced because irregular combustion which did not take place in the compression stroke injection mode takes place in the engine. Therefore, as with MPI engines, a torque shock can be reduced when a transition to a fuel cut mode is made. In other words, if switching is performed from the compression stroke injection mode to the intake stroke injection mode, the output torque of the engine will be reduced, because irregular combustion will take place even if an increasing tendency is seen in the torque output of the engine, as shown in FIG. 8(C). The fuel injection period becomes less than a predetermined injection period α2 for the intake stroke injection mode (α2>α1, α: predetermined injection period for the compression stroke injection mode), whereby a torque shock can be reduced when a transition to a fuel cut mode is made.

Thus, the second embodiment is capable of avoiding an uncomfortable torque shock when a transition to a fuel cut mode is made, by switching the operating mode (fuel injection mode) from the compression stroke injection mode to the intake stroke injection mode.

Note that the predetermined injection period α is set according to the operating mode (fuel injection mode) of the engine. In the compression stroke injection mode in which boost pressure is low and engine output torque is small, such as a late lean mode, the predetermined injection period α is set relatively small. Therefore, there is another advantage that a fuel cut effect is also obtainable, obtaining sufficiently the suppression effect of torque shock occurrence.

In the intake stroke injection mode in which boost pressure is high and engine output torque is great, such as an early lean mode or a stoichiometric mode, since the predetermined injection period α is set relatively great, a suppression effect of torque shock occurrence and a fuel cut effect can be balanced with each other.

Note that in this embodiment, while the first predetermined period N1IG has been set and also the judgment means 103 has judged that fuel cut conditions have been established and confirmed that the throttle valve has been fully closed after the elapse of the first predetermined period N1IG, the apparatus of the present invention may omit the judgment related to the first predetermined period N1IG, because the start of fuel cut has been judged based on whether or not the fuel injection period (injector pulse width) has been less than the predetermined injection period α and, in the case where the fuel injection period (injector pulse width) has been less than the predetermined injection period α, it can be judged that the throttle valve has also been closed fully.

In addition, the predetermined injection period α has been taken to be a fixed value in each operating mode, but, if it is varied according to engine speed or a degree of deceleration, control will be complicated but even finer control will be possible.

Industrial Applicability

According to the fuel control apparatus for an in-cylinder injection internal combustion engine of the present invention, a quick transition to a fuel cut mode can be made suppressing a torque shock, and similarly, when fuel cut is returned to fuel supply, a return to fuel supply can be performed suppressing a torque shock. Accordingly, the fuel control apparatus of the present invention can more efficiently obtain advantageous effects, such as saving of fuel consumption by fuel cut and prevention of the excessive temperature rise of an exhaust gas purifying catalyzer due to excess hydrocarbon (HC). If the fuel control apparatus is applied, for example, to the engine of a vehicle such as an automobile, it can simultaneously meet various demands for vehicle engines, such as operating cost reduction by low fuel consumption and environmental protection by acceleration of exhaust gas purification, enhancing drivability, and therefore it is extremely serviceable.

We claim:

1. A fuel control apparatus for an in-cylinder injection internal combustion engine, the internal combustion engine injecting fuel directly into a combustion chamber and also being able to select according to an operating state of said internal combustion engine a compression stroke injection mode in which fuel injection is performed primarily on a compression stroke, the fuel control apparatus comprising:

deceleration state detection means for detecting whether or not said internal combustion engine is in a deceleration state;

idle detection means for detecting whether or not said internal combustion engine is in an idle state;

target air-fuel ratio setting means for setting a target air-fuel ratio for said compression stroke injection mode; and air-fuel ratio control means which can control an air-fuel ratio, based on the target air-fuel ratio set by said target air-fuel ratio setting means;

wherein said target air-fuel ratio setting means sets a first target air-fuel ratio as said target air-fuel ratio, when said deceleration state detection means detects that said internal combustion engine is in a deceleration state and also said idle state detection means detects that said internal combustion engine is not in an idle state, at the time of said compression stroke injection mode, and also sets as said target air-fuel ratio a value changed stepwise toward a second target air-fuel ratio on a leaner side than said first target air-fuel ratio, when said deceleration state detection means detects that said internal combustion engine is in a deceleration state and also said idle detection means detects that said internal combustion engine is in an idle state, at the time of said compression stroke injection mode.

2. The fuel control apparatus for an in-cylinder injection internal combustion engine as set forth in claim 1, wherein said first target air-fuel ratio is set so as to change stepwise to a lean side.

3. The fuel control apparatus for an in-cylinder injection internal combustion engine as set forth in claim 1, wherein said target air-fuel ratio setting means first increases said target air-fuel ratio instantly to a third target air-fuel ratio on a richer side than said second target air-fuel ratio and then sets a value changed stepwise toward said second target air-fuel ratio, when said deceleration state detection means detects that said internal combustion engine is in a deceleration state and also said idle detection means detects that said internal combustion engine is in an idle state, at the time of said compression stroke injection mode.

4. A fuel control apparatus for an in-cylinder injection internal combustion engine, the internal combustion engine injecting fuel directly into a combustion chamber and also being able to select according to an operating state of said internal combustion engine a fuel supply mode including a compression stroke injection mode in which fuel injection is performed primarily on a compression stroke and a fuel cut mode in which supply of fuel to the combustion chamber is cut, and furthermore being able to select said compression stroke injection mode when said fuel cut mode is returned to said fuel supply mode, the fuel control apparatus comprising:

idle detection means for detecting whether or not said internal combustion engine is in an idle state;

judgment means for judging whether or not return conditions from said fuel cut mode to said fuel supply mode have been established, based on detection information, from said idle detection means and the operating state of said internal combustion engine;

deceleration state detection means for detecting a degree of deceleration of said internal combustion engine;

target air-fuel ratio setting means for setting a target air-fuel ratio for said compression stroke injection mode; and air-fuel ratio control means which can control an air-fuel ratio, based on the target air-fuel ratio set by said target air-fuel ratio setting means;

wherein said target air-fuel ratio setting means sets a first target air-fuel ratio as said target air-fuel ratio, when said judgment means judges that said return conditions have been established and also said degree of deceleration detected by said deceleration state detection means is equal to or greater than a predetermined value;

also sets as said target air-fuel ratio a second target air-fuel ratio on a leaner side than said first target air-fuel ratio, when said judgment means judges that said return conditions have been established and also said degree of deceleration detected by said deceleration state detection means is less than the predetermined value; and furthermore performs a return from said fuel cut mode to said fuel supply mode, while said air-fuel ratio control means is controlling an air-fuel ratio with said first or second return target air-fuel ratio set by said target air-fuel ratio setting means, at the time of the establishment of said return conditions.

5. The fuel control apparatus for an in-cylinder injection internal combustion engine as set forth in claim 4, wherein said target air-fuel ratio setting means is set so that in the case where said second return target air-fuel ratio is set as said target air-fuel ratio, thereafter said target air-fuel ratio is gradually reduced toward said first return target air-fuel ratio on a fuel-enriched side.

6. The fuel control apparatus for an in-cylinder injection internal combustion engine as set forth in claim 4, wherein fuel cut conditions for selecting said fuel cut mode are that rotation speed of said internal combustion engine is equal to or greater than a predetermined rotation speed and that said internal combustion engine is in an idle state.

7. A fuel control apparatus for an in-cylinder injection internal combustion engine, the internal combustion engine injecting fuel directly into a combustion chamber and being able to select according to an operating state of said internal combustion engine a fuel supply mode including a compression stroke injection mode in which fuel injection is performed primarily on a compression stroke an intake stroke injection mode in which fuel injection is performed primarily on an intake stroke, and a fuel cut mode in which supply of fuel to the combustion chamber is cut, the fuel control apparatus comprising:
deceleration state detection means for detecting whether or not said internal combustion engine is in a deceleration state;
idle detection means for detecting whether or not said internal combustion engine is in an idle state;
target air-fuel ratio setting means for setting a target air-fuel ratio for said compression stroke injection mode; and
air-fuel ratio control means which can control an air-fuel ratio, based on the target air-fuel ratio set by said target air-fuel ratio setting means;
wherein said target air-fuel ratio setting means sets a first target air-fuel ratio as said target air-fuel ratio, when said deceleration state detection means detects that said internal combustion engine is in a deceleration state and also said idle detection means detects that said internal combustion engine is not in an idle state, at the time of said compression stroke injection mode; and
wherein said fuel supply mode is switched from said compression stroke injection mode to said intake stroke injection mode, when said deceleration state detection means detects that said internal combustion engine is in a deceleration state and also said idle detection means detects that said internal combustion engine is in an idle state, at the time of said compression stroke injection mode.

8. The fuel control apparatus for an in-cylinder injection internal combustion engine as set forth in claim 7, wherein fuel cut conditions for selecting said fuel cut mode are that rotation speed of said internal combustion engine is equal to or greater than a predetermined rotation speed and that said internal combustion engine is in an idle state.

9. A fuel control apparatus for an in-cylinder injection internal combustion engine, the internal combustion engine injecting fuel directly into a combustion chamber and also having a fuel cut mode in which supply of fuel to the combustion chamber is cut, and furthermore being able to select said fuel cut mode in accordance with an operating state of said internal combustion engine, the fuel control apparatus comprising:
injection period setting means for setting a fuel injection period for said fuel injection valve;
judgment means for judging whether or not fuel cut conditions have been established, based on the operating state of said internal combustion engine; and
mode selection means for selecting said fuel cut mode, if said judgment means judges that said fuel cut conditions have been established and also the fuel injection period set by said injection period setting means is less than a predetermined injection period.

10. The fuel control apparatus for an in-cylinder injection internal combustion engine as set forth in claim 9, wherein said mode selection means is constructed so that it selects said fuel cut mode, if said judgment means judges that said fuel cut conditions have been established but a state, in which the fuel injection period set by said injection period setting means is not less than a predetermined injection period, continues only for a predetermined period.

11. The fuel control apparatus for an in-cylinder injection internal combustion engine as set forth in claim 9, wherein said in-cylinder injection internal combustion engine is provided with a fuel injection mode including an intake stroke injection mode in which fuel injection is performed primarily on an intake stroke and a compression stroke injection mode in which fuel injection is performed primarily on a compression stroke, and is constructed so that these fuel injection modes can be switched in accordance with the operating state of said internal combustion engine; and wherein said predetermined injection period is set separately for each of said fuel injection modes and said predetermined injection period in said compression stroke injection mode is set to a shorter period than said predetermined injection period in said intake stroke injection mode.

12. The fuel control apparatus for an in-cylinder injection internal combustion engine as set forth in claim 9, wherein fuel cut conditions for selecting said fuel cut mode are that rotation speed of said internal combustion engine is equal to or greater than a predetermined rotation speed and that said internal combustion engine is in an idle state.

* * * * *